US008046672B2

(12) United States Patent
Hegde et al.

(10) Patent No.: US 8,046,672 B2
(45) Date of Patent: *Oct. 25, 2011

(54) METHOD AND SYSTEM FOR DELIVERING TECHNOLOGY AGNOSTIC RICH MEDIA CONTENT WITHIN AN EMAIL, BANNER AD, AND WEB PAGE

(75) Inventors: Kiran Venkatesh Hegde, Redmond, WA (US); Raymond Edward McGrath, Bellevue, WA (US); Jason Matthew Walter Kind, Shoreline, WA (US); Eric Kane Krause, Woodinville, WA (US); Josiah DeWitt, Renton, WA (US); Stephen M. Wyand, Renton, WA (US); Brian David Young, Seattle, WA (US)

(73) Assignee: Dandia Audio KG Limited Liability Company, Wilmington, DE (US)

( * ) Notice: Subject to any disclaimer, the term of this patent is extended or adjusted under 35 U.S.C. 154(b) by 382 days.

This patent is subject to a terminal disclaimer.

(21) Appl. No.: 10/084,258

(22) Filed: Feb. 25, 2002

(65) Prior Publication Data

US 2002/0129089 A1    Sep. 12, 2002

Related U.S. Application Data

(63) Continuation-in-part of application No. 10/046,135, filed on Jan. 11, 2002.

(60) Provisional application No. 60/271,035, filed on Feb. 23, 2001.

(51) Int. Cl.
*G06N 3/00* (2006.01)
(52) U.S. Cl. ...................................... 715/200
(58) Field of Classification Search ............... 715/500.1, 715/517, 513, 523, 530, 234, 243, 254, 255, 715/200; 709/200
See application file for complete search history.

(56) References Cited

U.S. PATENT DOCUMENTS

| 5,666,554 | A |   | 9/1997  | Tanaka |
| 5,727,157 | A |   | 3/1998  | Orr et al. |
| 5,764,241 | A |   | 6/1998  | Elliott et al. |
| 5,818,436 | A | * | 10/1998 | Imai et al. ................. 715/500.1 |
| 5,852,800 | A | * | 12/1998 | Modeste et al. ........... 704/270.1 |
| 5,892,915 | A |   | 4/1999  | Duso et al. .................... 709/219 |
| 5,943,046 | A |   | 8/1999  | Cave et al. .................... 715/716 |
| 5,996,015 | A |   | 11/1999 | Day et al. |
| 6,003,041 | A |   | 12/1999 | Wugofski |

(Continued)

OTHER PUBLICATIONS

"Final Office Action", U.S. Appl. No. 11/603,381, (Aug. 17, 2009), 14 pages.

(Continued)

*Primary Examiner* — Kyle Stork

(57) ABSTRACT

The present invention plays rich media presentations included in an email, banner ad, and web page. Rich media presentations may be automatically played within an email, banner ad, and web page. When a video banner (Vbanner), video email (Vmail), or video page (Vpage) is included in a requested page, the requesting device receives the necessary rich media presentations, including a virtual player, presentation packages, and media packages, necessary to play the presentation. When the banner ad is downloaded, the rich media presentation begins to automatically play within the page on supported devices. Many options may be set controlling the operation of the Vbanner, Vmail and Vpage. A virtual player is created that includes code to play media files. A presentation package is created that sets the presentation attributes for the multimedia experience. A media package is created that instructs the virtual player what multimedia content to play.

25 Claims, 22 Drawing Sheets

U.S. PATENT DOCUMENTS

| | | | |
|---|---|---|---|
| 6,046,750 A | 4/2000 | Fitzpatrick et al. | |
| 6,049,828 A | 4/2000 | Dev et al. | |
| 6,248,649 B1 | 6/2001 | Henley et al. | 438/515 |
| 6,248,946 B1 | 6/2001 | Dwek | |
| 6,262,724 B1* | 7/2001 | Crow et al. | 715/723 |
| 6,356,921 B1 | 3/2002 | Kumar et al. | |
| 6,421,692 B1 | 7/2002 | Milne et al. | |
| 6,446,080 B1 | 9/2002 | Van Ryzin et al. | 707/104.1 |
| 6,446,130 B1 | 9/2002 | Grapes | 709/231 |
| 6,448,980 B1* | 9/2002 | Kumar et al. | 715/745 |
| 6,496,981 B1 | 12/2002 | Wistendahl et al. | |
| 6,535,888 B1 | 3/2003 | Vijayan et al. | 707/104.1 |
| 6,546,558 B1 | 4/2003 | Taguchi | |
| 6,553,413 B1 | 4/2003 | Lewin et al. | |
| 6,567,918 B1* | 5/2003 | Flynn et al. | 726/7 |
| 6,598,075 B1 | 7/2003 | Ogdon et al. | 709/204 |
| 6,601,009 B2 | 7/2003 | Florschuetz | 702/124 |
| RE38,284 E | 10/2003 | Allen et al. | |
| 6,637,031 B1 | 10/2003 | Chou | 725/87 |
| 6,745,368 B1* | 6/2004 | Boucher et al. | 715/500.1 |
| 6,834,308 B1 | 12/2004 | Ikezoye et al. | 709/231 |
| 6,948,131 B1 | 9/2005 | Neven et al. | |
| 6,985,934 B1* | 1/2006 | Armstrong et al. | 709/219 |
| 7,010,580 B1* | 3/2006 | Fu et al. | 709/217 |
| 7,111,057 B1 | 9/2006 | Sherman et al. | |
| 7,133,837 B1* | 11/2006 | Barnes, Jr. | 705/26 |
| 7,155,436 B2* | 12/2006 | Hegde et al. | 1/1 |
| 7,178,161 B1 | 2/2007 | Fristoe et al. | |
| 7,233,948 B1 | 6/2007 | Shamoon et al. | |
| 7,240,100 B1 | 7/2007 | Wein et al. | |
| 7,299,291 B1 | 11/2007 | Shaw | |
| 7,308,487 B1 | 12/2007 | Dansie et al. | |
| 7,386,784 B2 | 6/2008 | Capps et al. | |
| 7,469,283 B2 | 12/2008 | Eyal et al. | |
| 7,596,619 B2 | 9/2009 | Leighton et al. | |
| 7,600,014 B2 | 10/2009 | Russell et al. | |
| 2001/0029523 A1 | 10/2001 | Mcternan et al. | 709/205 |
| 2001/0047348 A1 | 11/2001 | Davis | 707/1 |
| 2001/0047422 A1 | 11/2001 | McTernan et al. | |
| 2002/0019831 A1* | 2/2002 | Wade | 707/500 |
| 2002/0082730 A1 | 6/2002 | Capps et al. | |
| 2002/0083138 A1 | 6/2002 | Wilson et al. | 709/206 |
| 2002/0099818 A1 | 7/2002 | Russell et al. | |
| 2002/0107940 A1 | 8/2002 | Brassil | |
| 2002/0124100 A1* | 9/2002 | Adams | 709/232 |
| 2002/0129052 A1 | 9/2002 | Glazer et al. | |
| 2002/0129089 A1 | 9/2002 | Hegde et al. | 709/200 |
| 2002/0169797 A1* | 11/2002 | Hegde et al. | 707/500.1 |
| 2002/0198953 A1* | 12/2002 | O'Rourke et al. | 709/213 |
| 2003/0018966 A1 | 1/2003 | Cooke et al. | |
| 2003/0028565 A1 | 2/2003 | Landsman et al. | |
| 2003/0187811 A1 | 10/2003 | Chang et al. | 707/1 |
| 2003/0191816 A1* | 10/2003 | Landress et al. | 709/219 |
| 2004/0006592 A1 | 1/2004 | Chang et al. | 709/203 |
| 2004/0090466 A1 | 5/2004 | Loveria, III | |
| 2005/0004838 A1 | 1/2005 | Perkowski et al. | |
| 2005/0010596 A1 | 1/2005 | Yoneyama | |
| 2005/0044189 A1 | 2/2005 | Ikezoye et al. | 709/219 |
| 2005/0081159 A1 | 4/2005 | Gupta et al. | 715/751 |
| 2005/0165842 A1 | 7/2005 | Nishimura et al. | |
| 2005/0165843 A1 | 7/2005 | Capps et al. | |
| 2005/0166136 A1 | 7/2005 | Capps et al. | |
| 2005/0256941 A1 | 11/2005 | Armstrong et al. | |
| 2006/0015904 A1 | 1/2006 | Marcus | |
| 2006/0026665 A1 | 2/2006 | Rodriguez et al. | |
| 2006/0064645 A1 | 3/2006 | Neven et al. | |
| 2006/0212361 A1 | 9/2006 | Perkowski | |
| 2007/0061845 A1 | 3/2007 | Barnes, Jr. | |
| 2007/0174442 A1 | 7/2007 | Sherman et al. | |
| 2007/0234196 A1 | 10/2007 | Nicol et al. | |
| 2007/0288588 A1 | 12/2007 | Wein et al. | |
| 2008/0134018 A1 | 6/2008 | Kembel et al. | |
| 2008/0134342 A1 | 6/2008 | Shamoon et al. | |
| 2008/0222243 A1 | 9/2008 | Shaw | |
| 2008/0235106 A1 | 9/2008 | Reisman | |
| 2009/0177742 A1 | 7/2009 | Rhoads et al. | |
| 2010/0100636 A1 | 4/2010 | Hegde et al. | |

OTHER PUBLICATIONS

"Non-Final Office Action", U.S. Appl. No. 11/603,381, (Jan. 15, 2010), 15 pages.

"Notice of Allowance", U.S. Appl. No. 11/603,381, (Jul. 13, 2010), 5 pages.

Bates, John et al., "Supporting Interactive Presentation Distributed Multimedia Applications", *Multimedia Tools and Applications Journal*, vol. 1, No. 1,(Mar. 1995), pp. 47-78.

Hollan, James et al., "Distributed Cognition: Toward a New Foundation for Human-Computer Interaction Research" *ACM Transactions on Computer-Human Interaction(TOCHI)*, vol. 7, No. 2,(Jun. 2000), pp. 174-196.

Kumar, Keeranoor G., et al., "The HotMedia Architecture: Progressive and Interactive Rich Media for the Internet", *Internet Media Group, IBM Corp.—IEEE.Transactions on Multimedia*, vol. 3, No. 2,(Jun. 2001), pp. 253-267.

"Non Final Office Action" U.S. Appl. No. 12/605,830,, 22 pages, Oct. 26, 2009.

Final Office Action issued in U.S. Appl. No. 12/605,830 and mailed on Feb. 17, 2011.

Non-final Office Action issued in U.S. Appl. No. 12/605,830 and mailed Sep. 16, 2010.

* cited by examiner

METHOD AND SYSTEM FOR DELIVERING TECHNOLOGY AGNOSTIC RICH MEDIA CONTENT WITHIN AN EMAIL, BANNER AD, AND WEB PAGE

RELATED APPLICATION

This application is a continuation-in-part of application Ser. No. 10/046,135 filed Jan. 11, 2002, which in-turn claims priority to U.S. Provisional Application No. 60/261,712, filed Jan. 12, 2001; this application also claims the benefit of U.S. Provisional Application No. 60/271,035, filed Feb. 23, 2001.

FIELD OF THE INVENTION

The present invention relates to providing rich media content over a network, and more specifically to automatically playing video within email, banner ads, and web pages.

BACKGROUND OF THE INVENTION

The Internet has seen expansive growth over the last several years. Not only are there more Web sites providing a wide range of information, service, and goods, there are more users on the Internet than ever before.

Today, users may experience multimedia clips, purchase goods, access the world's news as it happens, obtain reviews on various items or products in a variety of formats, or access a variety of resources all on the Internet. For example, a user may read product reviews, view pictures of a product, or in some instances, watch a video presentation related to the product.

In order to access the available resources, however, Internet users are exposed to a variety of different media types while visiting a Web site. Not only may users access textual information, they may also view graphical images, or watch multimedia presentations, including audio and video, that may be streamed or downloaded. The steps required to access this media, however, may be overwhelming to many of the users. Not only do certain sites require users to use particular products to access the media, many sites require the user to know the configuration of their system in order to play certain media files. For example, a user may have to download a particular media player, upgrade to a different version, or know the particular programs they are using on their system. With so many available options to access and play media files, users are constantly bombarded with different requirements.

Another requirement to view many multimedia sites is a high bandwidth connection to the Internet. Many sites rely on the user having a high bandwidth when streaming media to the user. While the majority of businesses today have access to broadband, the majority of home users connect to the Internet through a low speed dial-up modem resulting in a poor multimedia experience.

SUMMARY OF THE INVENTION

The present invention is directed at providing a method and system for providing rich media presentations in a banner ad, email, and a page, to a network device.

According to one aspect of the invention, rich media presentations may be played within a banner ad. When a video banner ad (Vbanner) is included in a requested page, the requesting device receives the necessary rich media presentations, including a virtual player, presentation packages, and media packages, necessary to play the presentation. When the banner ad is downloaded, the rich media presentation begins to automatically play within the page on supported devices. Many options may be set controlling the operation of the Vbanner.

According to yet another aspect of the invention, rich media presentations may be played automatically within an email. When a video email (Vmail) is sent to a recipient, the requesting device receives the necessary rich media presentations, including a virtual player, presentation packages, and media packages, necessary to play the presentation within the email. When the email is opened, the rich media presentation begins to automatically play within the email on supported devices. Many options may be set controlling the operation of the Vmail.

According to yet another aspect of the invention, rich media presentations may be played automatically within a web page window. When a video page (Vpage) is requested by a device, the requesting device receives the necessary rich media presentations, including a virtual player, presentation packages, and media packages, necessary to play the presentation within the page. When the page opens, the rich media presentation begins to automatically play on supported devices. Many options may be set controlling the operation of the Vpage.

According to still yet another aspect of the invention, the rich media presentations are retrieved from a location on the network that is directed at providing optimized throughput to the requesting device. When the rich media presentations are cached at the location on the network, the rich media presentations are delivered to the device. Otherwise, the appropriate rich media presentations are created for the device, and the rich media presentations are cached for future delivery. Alternatively, the rich media presentations may be generated in real-time and delivered.

DETAILED DESCRIPTION OF THE PREFERRED EMBODIMENT

Figure 1:
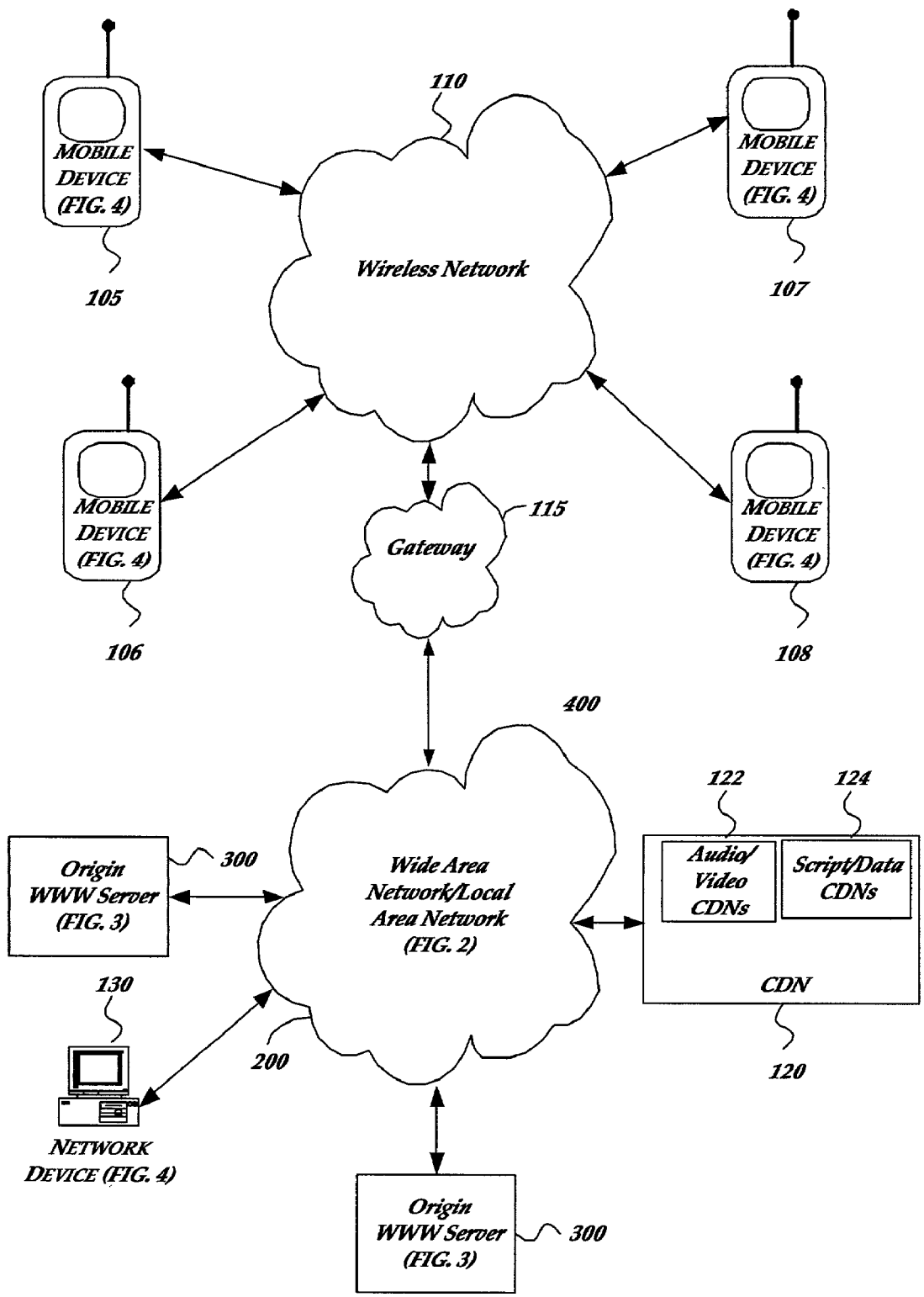
FIG. 1 illustrates a schematic diagram of an exemplary network overview, in which the invention may operate.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise. The term "rich media presentation" includes a virtual player, presentation package, and media package. The term "virtual player" means a set of proxy codes that are implemented at runtime with code optimized specifically to the device in question to play media content. The term "presentation package" means attributes that offer a way to dynamically and remotely control user experience for wide-ranging streaming media playback devices that correspond to display and presentation of media. The term "media package" means a way to dynamically and remotely control varying types of media content to a wide range of network media playback devices without having to deal with the specifics of each device nor the streaming server network protocols. The term "Vmail" refers to a video email. The term "Vbanner" refers to a video banner. The term "Vpage" refers to a page including a rich presentation package. The term "provider" means the party that provides the rich media presentations to a device. The term "e-retailer or client" means a party that has an affiliation with the provider. The term "user" or "customer" refers to an individual to which the rich media presentation, such as a video, is directed toward. Referring to the drawings, like numbers indicate like parts throughout the views. Additionally, a reference to the singular includes a reference to the plural unless otherwise stated or is inconsistent with the disclosure herein.

With reference to FIG. 1, an exemplary system in which the invention operates includes wireless mobile devices 105-108, wireless network 110, gateway 115, one or more content delivery networks (CDN) 120, wide area network (WAN)/local area network (LAN) 200, one or more network devices 130, and one or more world wide web (WWW) origin servers 300.

Figure 4:
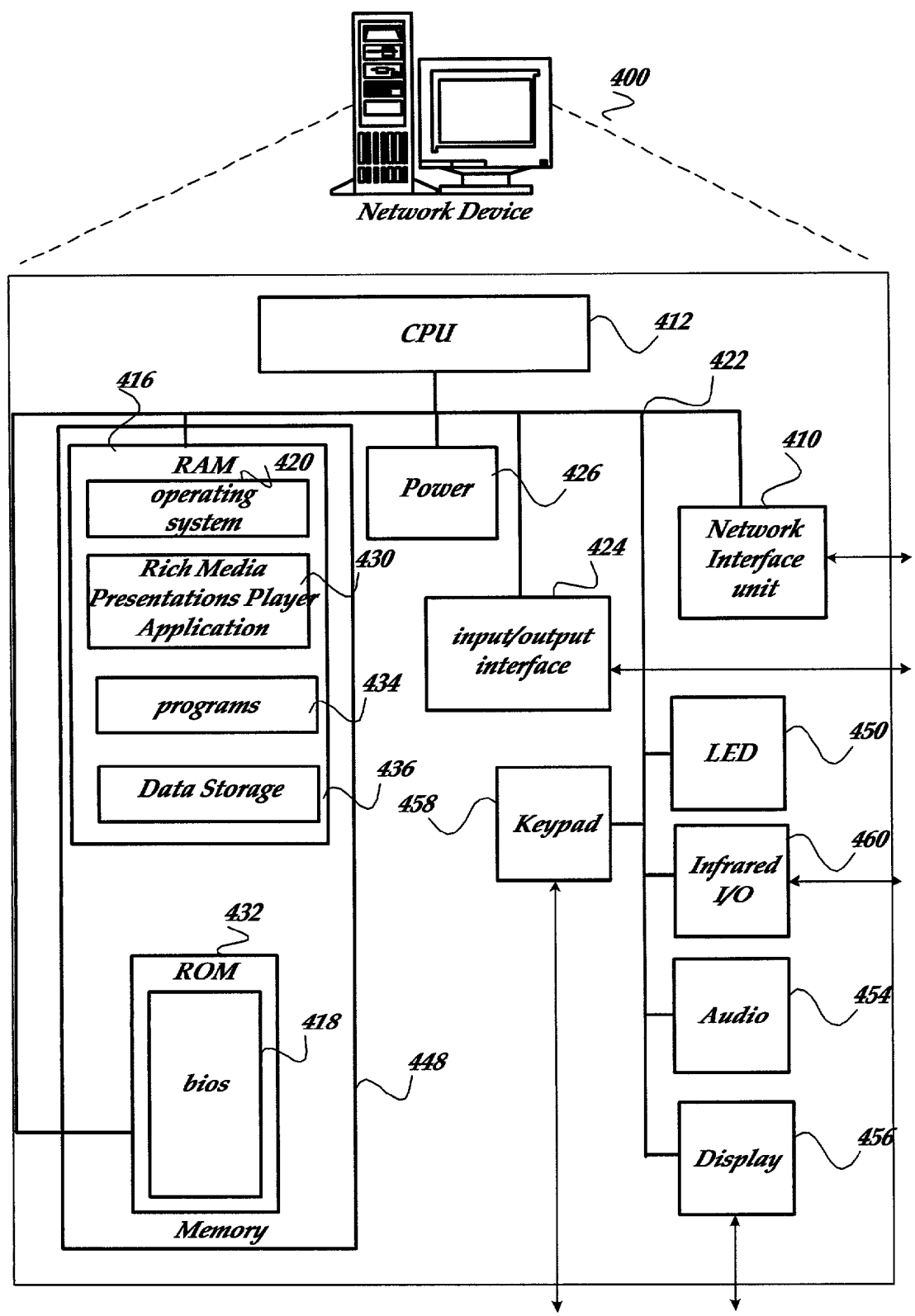
FIG. 4 shows a schematic diagram of an exemplary network device.

Wireless devices 105-108, are coupled to wireless network 110 and are described in more detail in conjunction with FIG. 4. Generally, mobile devices 105-108 include any device capable of connecting to a wireless network such as wireless network 110. Such devices include cellular telephones, smart phones, pagers, radio frequency (RF) devices, infrared (IR) devices, citizen band radios (CBs), integrated devices combining one or more of the preceding devices, and the like. Mobile devices 105-108 may also include other devices that have a wireless interface such as PDAs, handheld computers, personal computers, multiprocessor systems, microprocessor-based or programmable consumer electronics, network PCs, wearable computers, and the like.

Wireless network 110 transports information to and from devices capable of wireless communication, such as mobile devices 105-108. Wireless network 110 may include both wireless and wired components. For example, wireless network 110 may include a cellular tower linked to a wired telephone network. Typically, the cellular tower carries communication to and from cell phones, pagers, and other wireless devices, and the wired telephone network carries communication to regular phones, long-distance communication links, and the like.

Wireless network 110 is coupled to WAN/LAN through gateway 115. Gateway 115 routes information between wireless network 110 and WAN/LAN 200. For example, a user using a wireless device may browse the Internet by calling a certain number or tuning to a particular frequency. Upon receipt of the number, wireless network 110 is configured to pass information between the wireless device and gateway 115. Gateway 115 may translate requests for web pages from wireless devices to hypertext transfer protocol (HTTP) messages, which may then be sent to WAN/LAN 200. Gateway 115 may then translate responses to such messages into a form compatible with the requesting device. Gateway 115 may also transform other messages sent from wireless devices 105-108 into information suitable for WAN/LAN 200, such as e-mail, audio, voice communication, contact databases, calendars, appointments, and the like.

Figure 2:
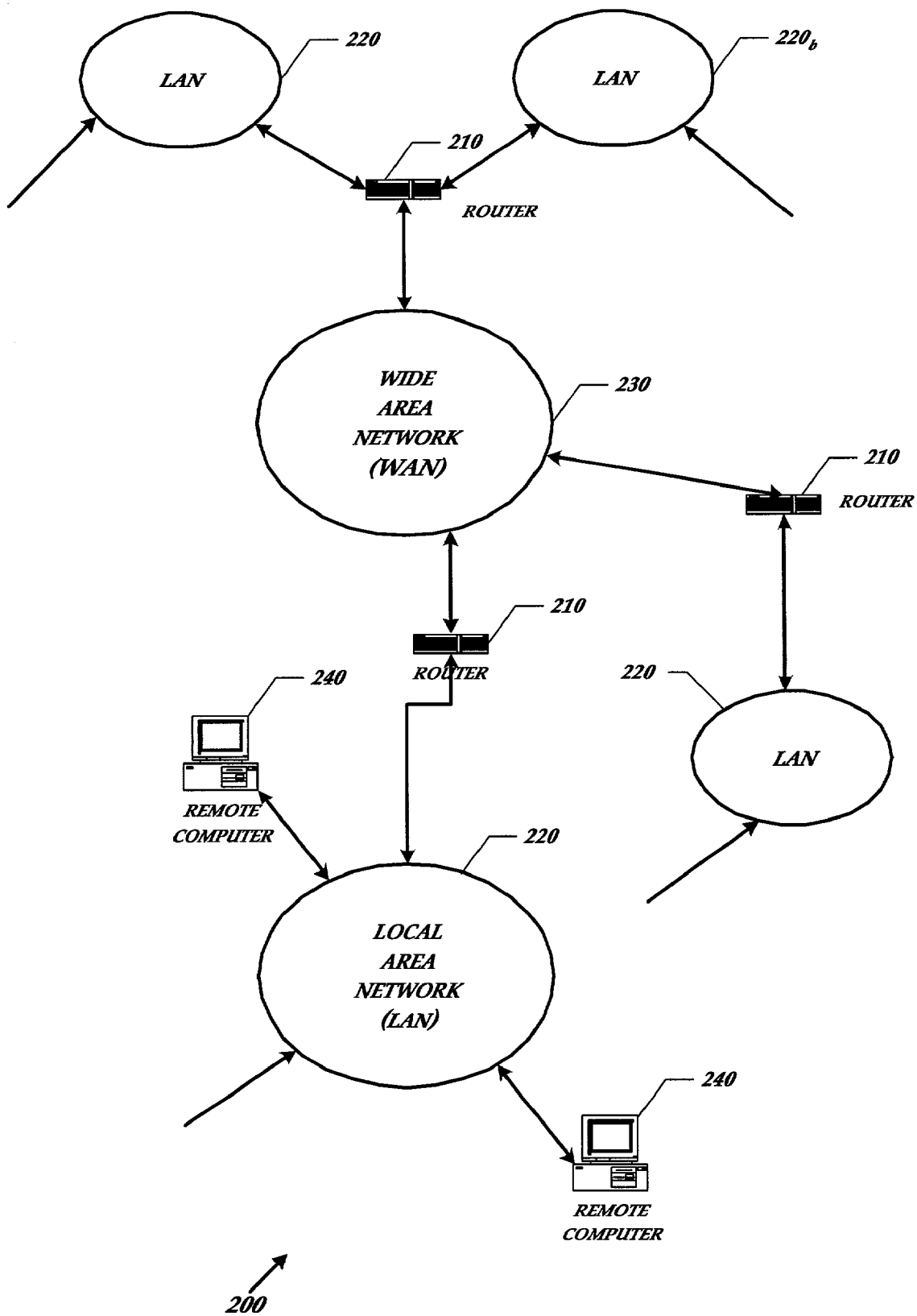
FIG. 2 shows a schematic diagram illustrating an exemplary system overview in which local area networks and a wide area network are interconnected by routers.

Typically, WAN/LAN 200 transmits information between computing devices as described in more detail in conjunction with FIG. 2. One example of a WAN is the Internet, which connects millions of computers over a host of gateways, routers, switches, hubs, and the like. An example of a LAN is a network used to connect computers in a single office. A WAN may connect multiple LANs.

Content delivery network (CDN) 120 is coupled to WAN/LAN 200 through communication mediums. CDN 120 may include many types of CDNs. For example, CDN 120 may include audio/video CDNs 122 designed to optimally deliver audio and video or script/data CDNs 124 designed to optimally deliver script or data to the requesting device. CDNs use various techniques to improve the performance of content delivery for Web sites. They may increase reliability of a web site by providing mirrored content across distributed servers and provide increased bandwidth as compared to a single server. CDNs may also employ various caching techniques to increase the end user's performance. Content may be pushed to the edges of the network to minimize delay associated with retrieving the content. Load balancing may also be used to help route a user's request for content to the best available content source. Typically, a web site subscribes to a CDN and instructs the CDN how to deliver its content. The subscribing web site may serve some content on its own avoiding the CDN and use the CDN to serve other content. While CDNs are typically used for WAN/LAN applications, the technology may be applied to intranets and extranets as well.

WWW origin servers 300 are coupled to WAN/LAN 200 through communication mediums. WWW origin servers 300 provide access to information and services as described in more detail in conjunction with FIG. 3.

Network device 130 is coupled to WAN/LAN 200 and is described in more detail in conjunction with FIG. 4. Generally, network device 130 includes any device capable of connecting to a data network, and includes the functionality to play media included in a media playlist.

FIG. 2 shows another exemplary system in which the invention operates in which a number of local area networks ("LANs") 220$_{a-d}$ and wide area network ("WAN") 230 interconnected by routers 210. Routers 210 are intermediary devices on a communications network that expedite message delivery. On a single network linking many computers through a mesh of possible connections, a router receives transmitted messages and forwards them to their correct destinations over available routes. On an interconnected set of LANs, including those based on differing architectures and protocols, a router acts as a link between LANs, enabling messages to be sent from one to another. Communication links within LANs typically include twisted wire pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, or other communications links known to those skilled in the art. Furthermore, computers, such as remote computer 240, and other related electronic devices can be remotely connected to either LANs 220$_{a-d}$ or WAN 230 via a modem and temporary telephone link. The number of WANs, LANs, and routers in FIG. 2 may be increased or decreased without departing from the spirit or scope of this invention. As such, it will be appreciated that the Internet itself may be formed from a vast number of such interconnected networks, computers, and routers and that an embodiment of the invention could be practiced over the Internet without departing from the spirit and scope of the invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

The Internet has recently seen explosive growth by virtue of its ability to link computers located throughout the world. As the Internet has grown, so has the WWW. Generally, the WWW is the total set of interlinked hypertext documents residing on HTTP servers around the world. Documents on the WWW, called pages or Web pages, are typically written in HTML (Hypertext Markup Language) or some other markup language, identified by URLs (Uniform Resource Locators) that specify the particular machine and pathname by which a file can be accessed, and transmitted from server to end user using HTTP. Codes, called tags, embedded in an HTML document associate particular words and images in the document with URLs so that a user can access another file, which may literally be halfway around the world, at the press of a key or the click of a mouse. These files may contain text (in a variety of fonts and styles), graphics images, movie files, media clips, and sounds as well as Java applets, ActiveX controls, or other embedded software programs that execute when the user activates them. A user visiting a Web page also may be able to download files from an FTP site and send messages to other users via email by using links on the Web page.

Figure 3:
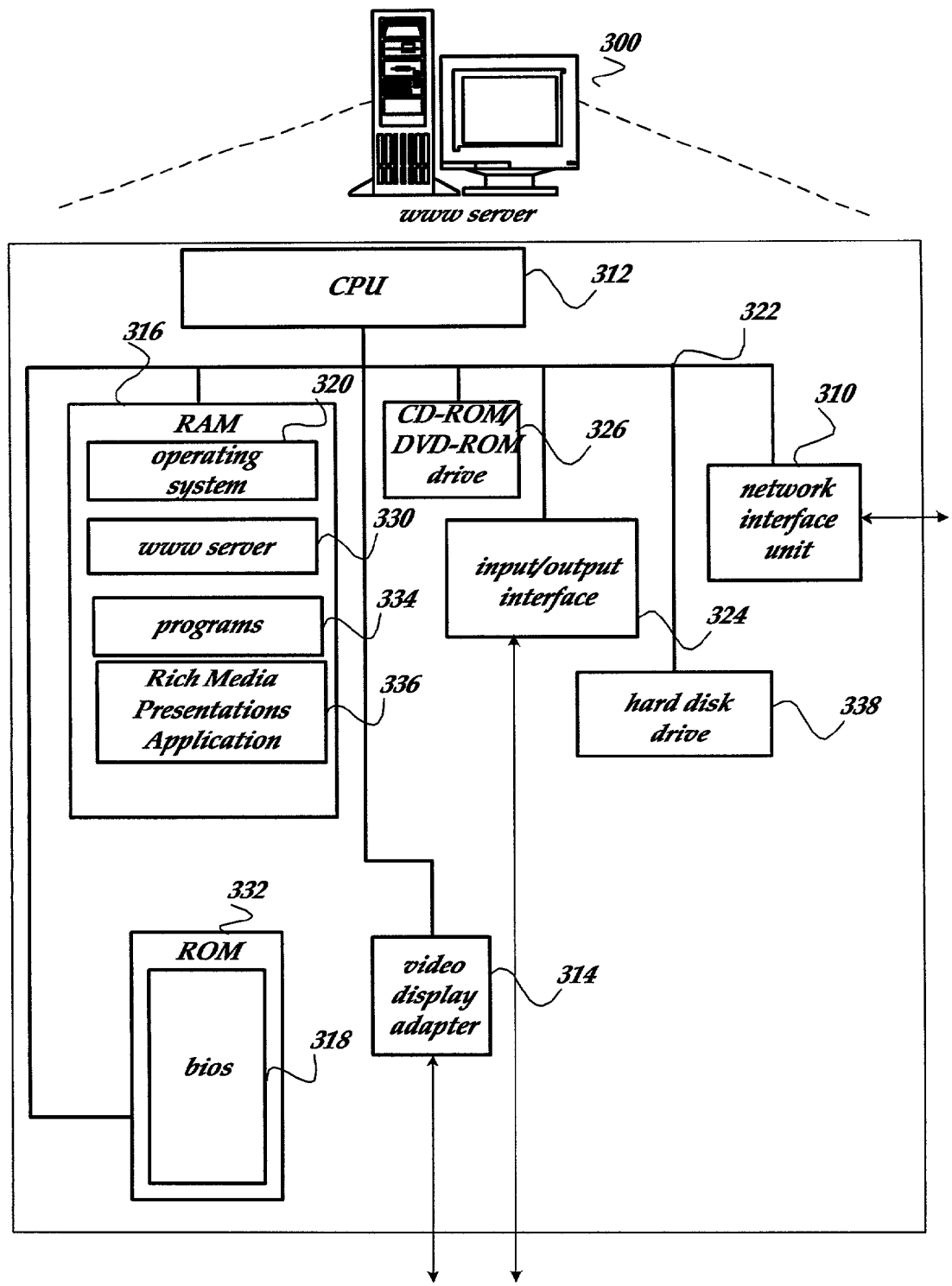
FIG. 3 illustrates a schematic diagram of an exemplary server.

A WWW origin server, as described in more detail in conjunction with FIG. 3, is a computer connected to the Internet having storage facilities for storing hypertext documents for a WWW site and running administrative software for handling requests for the stored hypertext documents. A hypertext document normally includes a number of hyperlinks, i.e., highlighted portions of text which link the document to another hypertext document possibly stored at a WWW site elsewhere on the Internet. Each hyperlink is associated with a URL that provides the location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA programming language from Sun Microsystems, for execution on a remote computer. Likewise, a WWW server may also include facilities for executing scripts and other application programs on the WWW server itself.

A user may retrieve hypertext documents from the WWW via a WWW browser application program located on a wired or wireless device. A WWW browser, such as Netscape's NAVIGATOR® or Microsoft's INTERNET EXPLORER®, is a software application program for providing a graphical user interface to the WWW. Upon request from the user via the WWW browser, the WWW browser accesses and retrieves the desired hypertext document from the appropriate WWW server using the URL for the document and HTTP. HTTP is a higher-level protocol than TCP/IP and is designed specifically for the requirements of the WWW. HTTP is used to carry requests from a browser to a Web server and to transport pages from Web servers back to the requesting browser or client. The WWW browser may also retrieve application programs from the WWW server, such as JAVA applets, for execution on a client computer.

FIG. 3 shows an exemplary WWW origin server 300 that is operative to provide a WWW site. Accordingly, WWW origin server 300 transmits WWW pages to the WWW browser application program executing on requesting devices to carry out this process. For instance, WWW origin server 300 may transmit pages and forms for receiving information about a user, such as user preferences, address, telephone number, billing information, credit card numbers, and the like. Moreover, WWW origin server 300 may transmit WWW pages to a requesting device that allow a user to participate in a WWW site. The transactions may take place over the Internet, WAN/LAN 200, or some other communications network known to those skilled in the art.

WWW origin server 300 may include many more components than those shown in FIG. 3. However, the components shown are sufficient to disclose an illustrative embodiment for practicing the present invention. As shown in FIG. 3, WWW origin server 300 is connected to WAN/LAN 200, or other communications network, via network interface unit 310. Network interface unit 310 includes the necessary circuitry for connecting WWW origin server 300 to WAN/LAN 200, and is constructed for use with various communication protocols including the TCP/IP protocol. Typically, network interface unit 310 is a card contained within WWW origin server 300.

WWW origin server 300 also includes processing unit 312, video display adapter 314, and a mass memory, all connected via bus 322. The mass memory generally includes RAM 316, ROM 332, and one or more permanent mass storage devices, such as hard disk drive 338, a tape drive, CD-ROM/DVD-ROM drive 326, and/or a floppy disk drive. The mass memory stores operating system 320 for controlling the operation of WWW origin server 300. This component may comprise a general purpose server operating system, such as UNIX, LINUX™, Microsoft WINDOWS NTO, and the like. Basic input/output system ("BIOS") 318 is also provided for controlling the low level operation of WWW origin server 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a WWW site. More specifically, the mass memory stores applications including WWW server application program 330, programs 334, and rich media presentation application 336. Generally, rich media presentation application 336 generates and provides rich media presentations to a requesting network device (See FIGURES and related discussion below). WWW server application program 330 includes computer executable instructions which, when executed by WWW origin server 300, generate WWW browser displays, including performing the logic described above. WWW origin server 300 may include a JAVA virtual machine, an SMTP handler application for transmitting and receiving email, an HTTP handler application for receiving and handing HTTP requests, JAVA applets for transmission to a WWW browser executing on a client computer, and an HTTPS handler application for handling secure connections. The HTTPS handler application may be used for communication with external security applications (not shown), to send and receive private information in a secure fashion.

WWW origin server 300 may also comprise input/output interface 324 for communicating with external devices, such as a mouse, keyboard, scanner, or other input devices not shown in FIG. 3. Likewise, WWW origin server 300 may further comprise additional mass storage facilities such as CD-ROM/DVD-ROM drive 326 and hard disk drive 338. Hard disk drive 338 is utilized by WWW origin server 300 to store, among other things, application programs, databases, and program data used by WWW server application program 330. For example, customer databases, product databases, image databases, and relational databases may be stored.

FIG. 4 shows an exemplary network device 400 that may be used to receive packages, according to one embodiment of the invention. Network device 400 may be arranged to transmit and receive data on a wireless network or wired network. For instance, network device 400 may send and receive data from other network devices (not shown) and servers (See FIG. 3 and related discussion) as well as receiving content, such as rich media presentations including media packages, presentation packages, and virtual players, as described below. The data transmissions may take place over the Internet, WAN/LAN 200, or some other communications network.

Network device 400 may include many more components than those shown in FIG. 4. However, the components shown are sufficient to disclose an illustrative embodiment for practicing the present invention. As shown in the figure, mobile device 400 includes central processing unit 412, memory 448, RAM 416, ROM 432, operating system 420, application 430, programs 434, data storage 436, bios 418, power 426, input/output interface 424, network interface unit 410, LED 450, audio 454, display 456, keypad 458, and infrared input/output 460.

Mobile device 400 may connect to WAN/LAN 200, or other communications network, via network interface unit 410. Network interface unit 410 includes the necessary circuitry for connecting the network device 400 to WAN/LAN 200, and is constructed for use with various communication protocols including the TCP/IP protocol. Network interface unit 410 may include a radio layer (not shown) that is arranged to transmit and receive radio frequency communications. Network interface unit 410 connects network device 400 to external devices, via a communications carrier or service provider.

Mass memory 448 generally includes RAM 416, ROM 432, and one or more data storage units 436. The mass memory stores operating system 420 for controlling the operation of mobile device 400. This component may comprise a general purpose server operating system such as a version of UNIX, LINUX™, Microsoft WINDOWS®, and the like. Basic input/output system ("BIOS") 418 is also provided for controlling the low-level operation of network device 400.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data used within network device 400. More specifically, the mass memory stores applications including rich media presentation application 430, and programs 434. Programs 434 may include computer executable instructions which, when executed by network device 400, transmit and receive WWW pages, e-mail, audio, video, and the like. One or more programs 434 may be loaded into memory 448 and run under control of operating system 420. Generally, rich media presentation player application 430 receives rich media presentations from a provider and performs the multimedia content relating to the rich media presentations (See FIGURES and discussion below). Examples of application programs include radio tuner programs, phone programs, communication programs, productivity programs (word processing, spreadsheet, etc.), browser programs, and the like. Network device 400 also includes ROM 432. ROM 432 may be used to store data that should not be lost when network device 400 loses power.

Network device 400 also comprises input/output interface 424 for communicating with external devices, such as a headset, or other input or output devices not shown in FIG. 4. Data storage 436 is utilized by network device 400 to store, among other things, application programs, databases, and program data used by the mobile device broadcast delivery application. For example, user databases, product databases, image databases, and relational databases may be stored. Keypad 458 may be any input device arranged to receive inputs from a user. For example, keypad 458 may be a push button numeric dialing, or a keyboard. Display 456 may be a liquid crystal display, or any other type of display commonly used in network devices. Display 456 may also be a touch screen arranged to receive a users inputs. Infrared input/output 460 may be used to send and receive infrared commands.

Power supply 426 provides power to network device 400. According to one embodiment, a rechargeable battery provides power. The power may be also be provided by an external power source, such as an AC adapter or a powered docking cradle that supplements or recharges the battery.

As shown, network device 400 includes light emitting diode (LED) display 450, and audio interface 454. LED display 450 may be controlled to remain active for specific periods or events. For example, an LED display may stay on while the phone is powered or may light up in response to other events. Audio interface 454 is arranged to receive and provide audio signals. For example, audio interface 454 may be coupled to a speaker (not shown) to provide audio from a telephone call, a tuner, or from some other audio source. Audio interface 454 may also be coupled to an input device, such as a microphone, to receive audio input.

Figure 5:
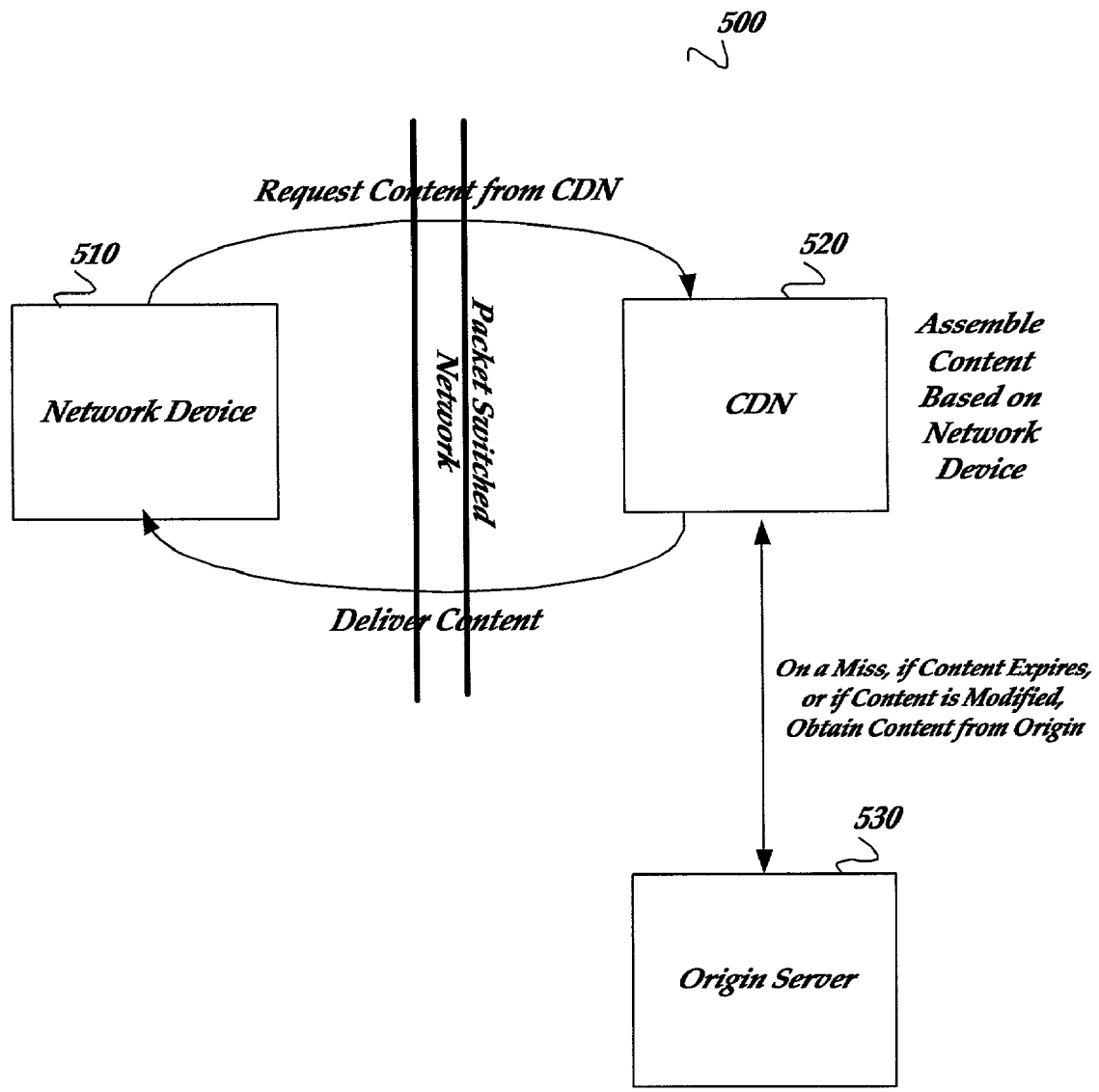
FIG. 5 illustrates a functional block diagram showing an on-demand content delivery system using a CDN.

FIG. 5 illustrates a functional block diagram showing an on-demand content delivery system using a CDN, according to one embodiment of the invention. As shown in the figure, on-demand content delivery system 500 includes network device 510, CDN 520, and origin server 530. Network device 510 and origin server 530 are coupled to CDN 520 through a network, such as a packet switched network.

Network device 510 requests content from a CDN. The content request may be for any type of content available from CDN 520 or origin server 530. According to one embodiment of the invention, the content request is for content associated with virtual player packages. For example, the content may be for a virtual player, presentation packages, or media packages that are specifically encoded for network device 510. CDN 520 receives the content request and attempts to assemble the content based on instructions from origin server 530. When the requested content is available, CDN 520 delivers the requested content to requesting device 510. When the requested content is not available on CDN 520, CDN 520 obtains the requested content from origin server 530. The content may not be available on CDN 520 for many reasons. For example, the requested content may be expired, new content may be available, or the requested content may not be located on CDN 520. As mentioned above, when the content is not available on CDN 520, CDN 520 obtains the content from origin server 530. The content is then maintained by CDN 520 according to the instructions regarding the content obtained from origin server 530. For example, CDN 520 may be instructed to maintain the content for some predetermined period. CDN 520 may be instructed to maintain the content for one minute, ten minutes, one day, one week, and the like.

CDN 520 delivers the content to the requesting device after it has obtained the content from origin server 530.

CDN 520 may be any number of CDNs available. For example, the following is a partial list of available CDNs and competing CDN technologies that may be used in accordance with aspects of the invention. The list is not meant to be exhaustive or provide all of the details relating to the CDN. Akamai provides content delivery and streaming media services, along with global traffic management. AppStream's infrastructure monitors the usage of central databases and applications, segments them, and proactively moves the computing resources to application servers closest to the users that need them. AT&T ICDS monitors the origin Web site for changes in content and replicates the changes on mirror sites across their worldwide networks and data facilities, including an expansive cable network. Digital Island provides delivery of all major kinds of content, including streaming media, and features multiple authentication methods to provide secure content delivery. SolidSpeed uses intelligent routing and network optimization to bypass internet bottlenecks. They work to find the most efficient route between your customers and your content. Speedera's CDN pushes content from web origin sites to caching servers at the "edge" of the Internet, much closer to users. XOSoft's CDN sends only the changes of documents combining mirrors and caches to synchronize content worldwide, and deliver fresh content to users quickly. As can be seen, the available CDNs are extensive and the appropriate CDNs may be chosen based on the content being delivered to the requesting device.

Figure 6:
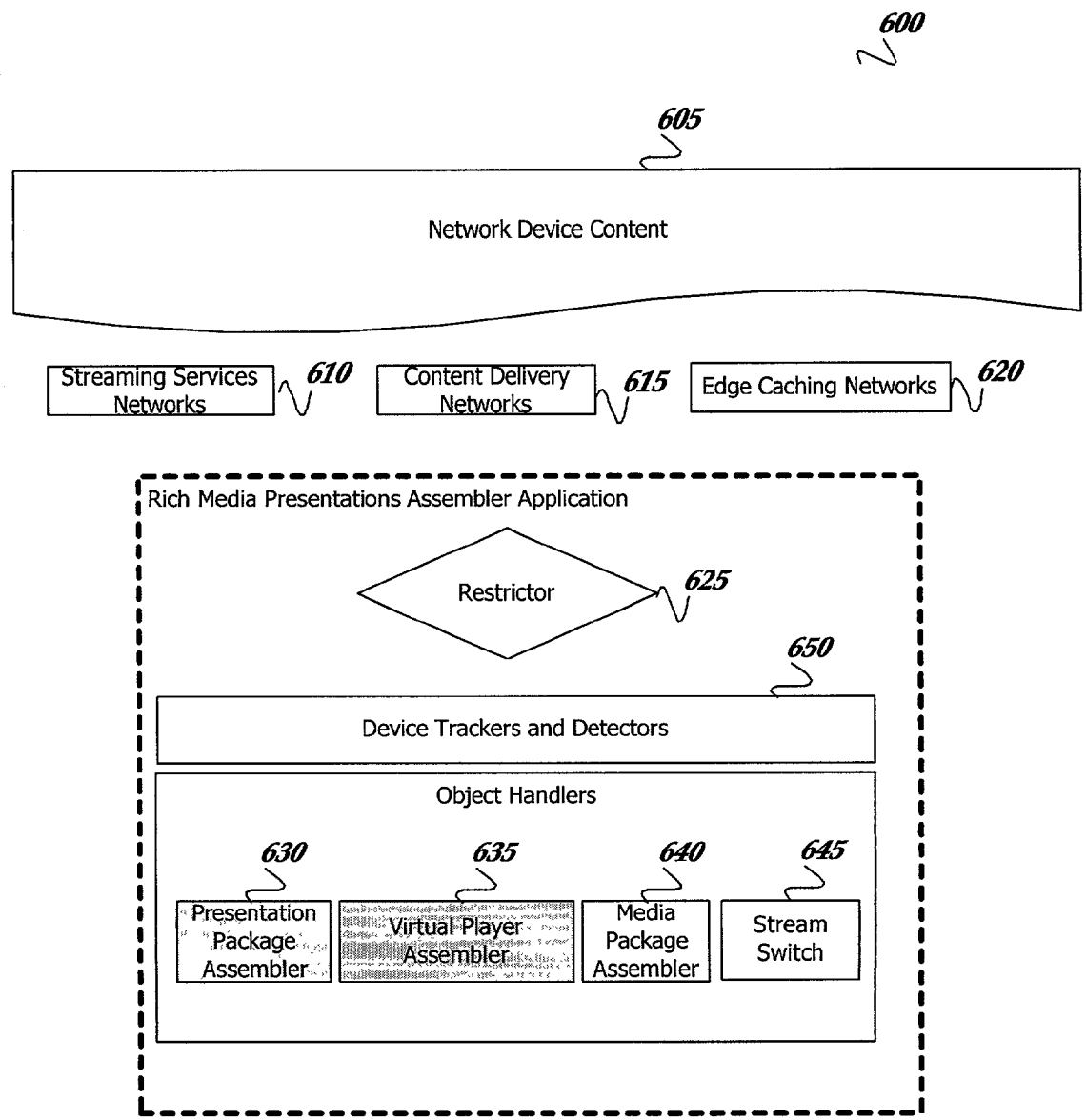
FIG. 6 illustrates a schematic diagram of a rich media presentation system.

FIG. 6 illustrates a schematic diagram of a rich media presentation system in accordance with aspects of the invention. As illustrated in the figure, rich media presentation system 600 includes network device content 605, streaming services networks 610, content delivery networks 615, edge caching networks 620, restrictors 625, presentation package assembler 630, virtual player assembler 635, media package assembler 640, stream switch 645, and device trackers and detectors 650.

The device may receive rich media presentations from many different networks. Network device content 605 may come from streaming services networks 610, content delivery networks 615, edge caching networks 620, as well as other networks (not shown). Restrictor 625 may restrict the device from receiving rich media presentations. According to one embodiment of the invention, restrictor 625 determines when the request for the rich media presentations is coming from a supported site. A supported site is a site on the network that has an affiliation with the provider of the rich media presentations. For example, a site not affiliated with the provider may attempt to incorporate the rich media presentations on their site. When the rich media presentations are requested by the device, restrictor 625 will recognize that the request is coming from an unaffiliated site and deny access. Restrictor 625 may be programmed to do many other tasks. For example, restrictor 625 may be programmed to return different versions of rich media presentations having varying capability based on the site location or some other attribute.

Figure 8:
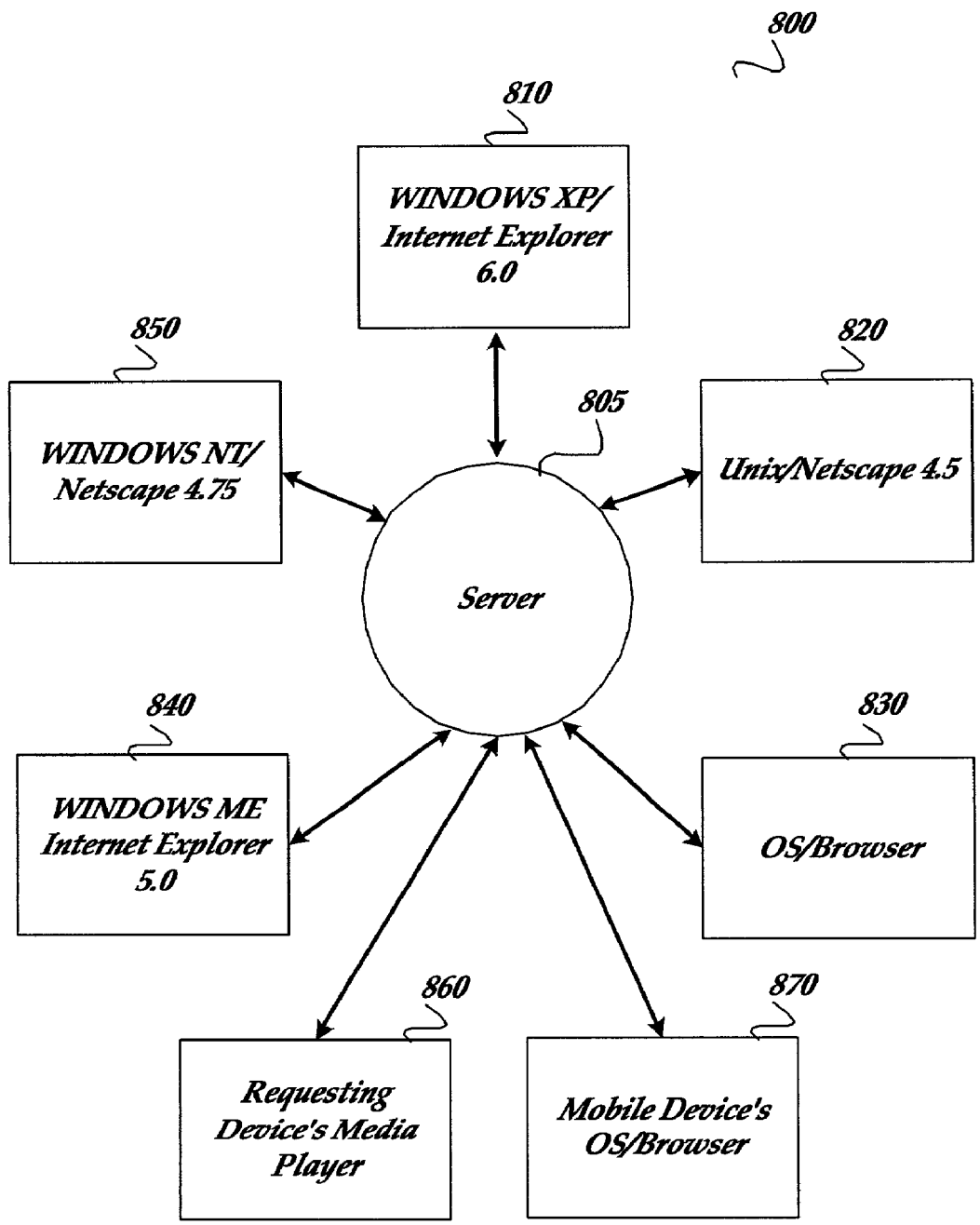
FIG. 8 illustrates an attribute inquiry system containing a set of exemplary basic attributes of network devices.
Figure 10:
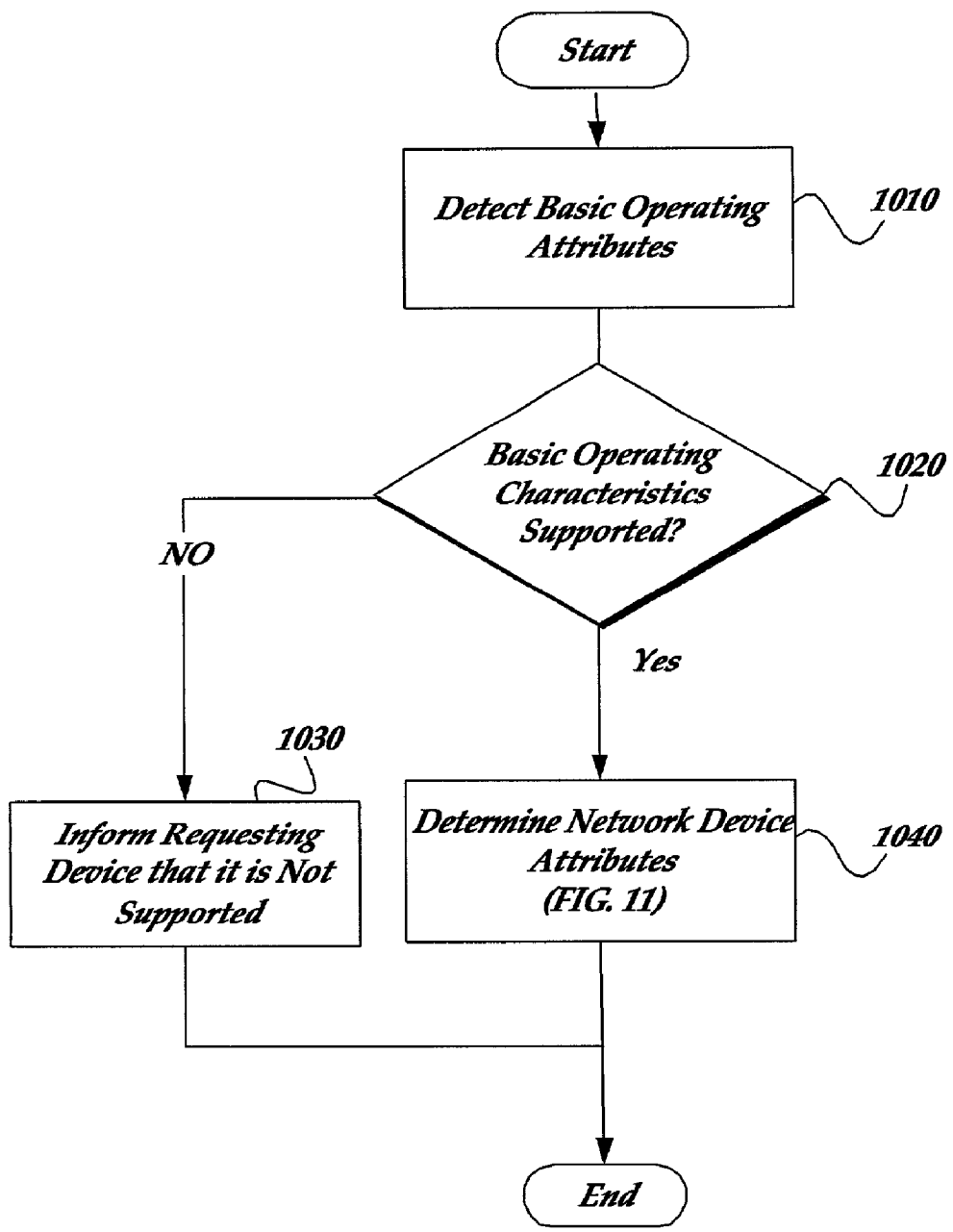
FIG. 10 illustrates a process for determining attributes related to a network device.
Figure 11:
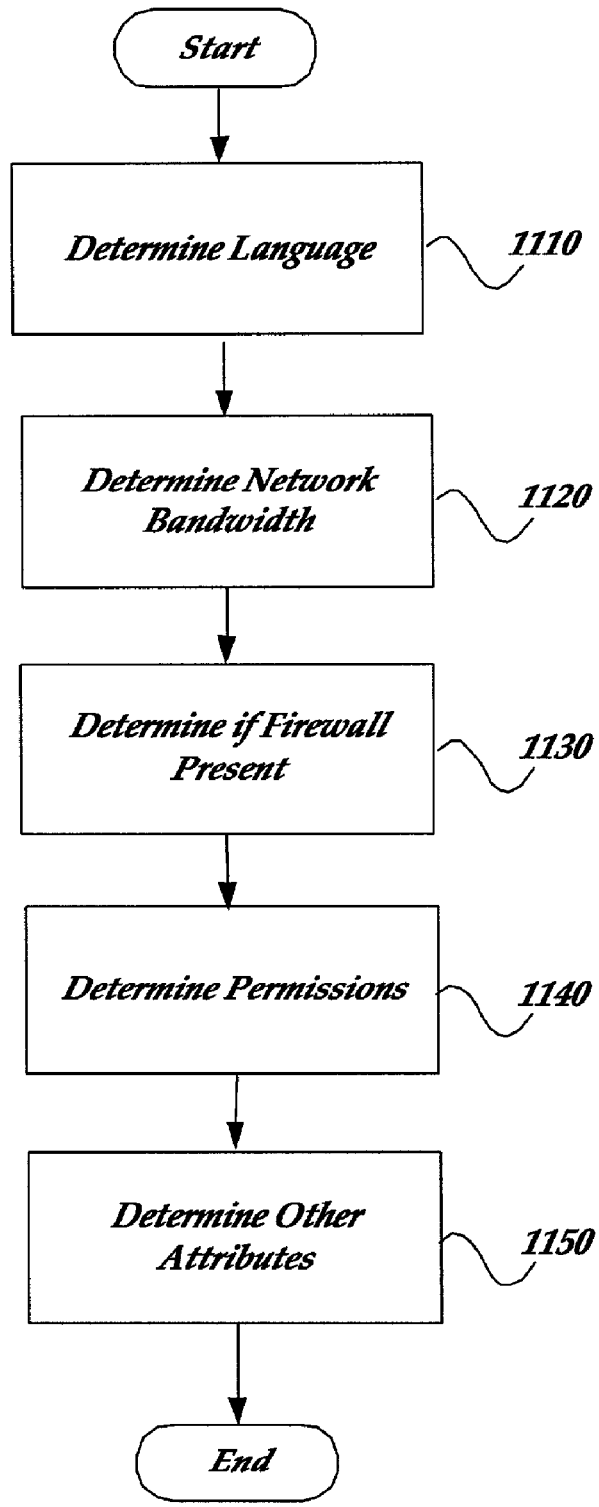
FIG. 11 shows a process for retrieving additional attributes from a device.

When the request for the rich media presentations moves beyond restrictor 625, device trackers and detectors 650 determines the requesting device's attributes (See FIGS. 8, 10, and 11 and related discussion). Generally, device trackers and detectors 650 determine the attributes to send optimized rich media presentations to the requesting device. Based on the attributes of the requesting device, the rich media presentations are assembled. An exemplary illustration of the operation of the rich media presentation system will now be described.

The object handlers including presentation package assembler 630, virtual player assembler 635, and media package assembler 640 may create their respective packages in advance of a request by a device or create the packages "just in time" (JIT) to meet the requesting device's configuration. For example, virtual player assembler may encode the virtual player package to be optimized for a WINDOWS 98 operating system using Windows Media Player V7.0 or some other device. According to one embodiment of the invention, the encoded virtual player packages are stored in a database and sent to a CDN and cached for a predetermined time. According to another embodiment, the virtual player packages are encoded when requested by a device.

Virtual player assembler 635 creates a virtual player for the requesting device. Different media players may be used by the virtual player. For example, Microsoft's Media Player and Real Networks' Media Player may be used by the virtual player to play the media packages. The virtual player assembler uses attributes determined by device tracker and detectors 650 to create optimized virtual player code for the requesting device. Instead of an e-retailer to having to include code on a web page for every possible media player, the e-retailer only includes a single line of code. The line of code is simply a request for an include file from a server. This include file contains the required JavaScript functions for a given browser and for the implementation of the videos relating to the presentation package and media package on a given web page. According to one embodiment of the invention, e-retailers place this line of code at the top of the body section of each Web page where a video will be available to the requesting device.

When loading a Web page containing the code, a network device requests the include file from servers relating to the provider. Before the virtual player code is delivered to the network device to be stored in network device content 605, device trackers and detectors 650 performs operating system and browser detection. This detection allows the virtual player assembler 635 to return the appropriate include file, the contents of which are browser specific. If the provider does not support a device's configuration, the provider will send all required packages containing stub functions. The returned include file including the browser and system-specific code is approximately 18 KB in size and will remain in the requesting device's browser cache. Thereafter, each time a requesting device requests the include file, the provider instructs the browser to use the copy of the file stored in the cache. A requesting device downloads this file again only if there has been a change to the include file on the server-side, or when the include file can not be found in the cache. Exemplary syntax for this line of code is as follows:
<script src="http://ondemand.vendaria.com/envision/idletize.idlet" language="JavaScript1.2" type="text/javascript"></script>

Presentation package assembler 630 sets the presentation attributes relating to the virtual player and media package. A presentation package line of code is included in the e-retailers Web page requesting a presentation package include file from a server. According to one embodiment of the invention, the presentation package include file contains creative specific presentation-package information, a combination of a "Watch Video" button, a customized media player skin, and a presentation type (embedded or popup). Multiple presentation packages may be used by the e-retailer. For example, a different package for each video on your site may be used. The presentation package include file is approximately 4 KB in size and remains in the requesting device's browser cache. Thereafter, each time the presentation package include file is requested by the device, the provider instructs the browser on the requesting device to use the copy of the file stored in the cache. A requesting device downloads this file again when there has been a change to the presentation package include file or when the file can not be found in the cache. Because e-retailers will likely use the same presentation package on multiple product pages, the speed and performance of the media presentation will improve markedly once a device has downloaded the presentation package include file. An exemplary syntax for this line of code is as follows:
<script src="http://ondemand.vendaria.com/envisio/{IdletPseudonym}.idlet" language="JavaScript" type="text/javascript"></script>
where: {IdletPseudonym} is a value that uniquely identifies an e-retailer's presentation package.

The code in the presentation package include file allows many presentation attributes relating to the rich media presentation to be set. For example, the rich media presentation's precise play location on a Web page may be set. A skin for the virtual player may be set. Images for buttons may be set. For example, an image separate from the default image for the "watch video" button may be set. The length of the rich media presentation may be displayed at a defined location. The presentation package and/or virtual player window may be automatically closed once a rich media presentation has stopped playing. In addition, text links may be used instead of buttons with images to trigger the start of a rich media presentation. Other presentation attributes may also be set. The attributes may be set within a Web page, or may be set using an API. The following is an exemplary syntax for defining some of the presentation attributes associated with the rich media presentation on a Web page.

<script language="JavaScript" type="text/javascript">
var vnd_idletOverride_{IdletPseudonym}=new vnd_objIdletOverride({LocationTop}, {LocationLeft}, "{Locator}", "{BURL}", {ShowLen}, {CenterScreen}, {AutoHide}); </script> where:
{IdletPseudonym} is a value that uniquely identifies an e-retailer's presentation package.
{LocationTop} is the top coordinate of the player skin or video, if no skin is selected.
{LocationLeft} is the left coordinate of the media skin or video, if no skin is selected.
{Locator} is the name of an image object located on the page used for positioning the top and left coordinates of the media player skin or video, if no skin is selected.
{BURL} is the complete URL of the image you will use to start a video in lieu of the "watch video" button.
{ShowLen} is the indicator that determines if text describing the length of the video will appear next to the Watch Video button.
{LocCenterScreen} is the indicator that determines if the skin and media player will be centered in the middle of the screen. If the value is set to false, then the skin or media player will be located based on the default attributes of the presentation package or the override values found in {LocationTop} and {LocationLeft} or {Locator}.
{AutoHide} is an optional indicator that determines if the media player layers disappear upon completion of a video. If the value is true, the skin and/or media player disappear immediately upon completion of the video; if false, the skin and/or media player will remain displayed on the page along with the final frame of the video.

The video may also be set to automatically set to start playing. Auto-play functionality enables a video to start playing immediately after a Web page has been loaded in a requesting device's browser. For example, this feature might be used to play a video welcoming an on-line consumer to a site or to provide instructions to consumers. According to one embodiment, e-retailers include the autoLoad function in the onload event in the body tag as follows: <body onLoad="vnd_autoLoad( )">

Media package assembler 640 assembles the combination of multimedia specific code and returns a media package include file to the requesting device. A third line of code is included within the e-retailers Web pages where the e-retailer would like a watch video button to appear on a product page. A server downloads the approximately 1 KB media package include file in a requesting device's browser cache each time the device accesses a Web page where a rich media presentation exists. An exemplary syntax for this line of code is as follows:
<script src="http://ondemand.vendaria.com/envision/{AdletPseudonym}.adlet?idlet={IdletPseudonym}" language="JavaScript" type="text/javascript"></script>
where:
{AdletPseudonym} is a value that identifies a unique combination of a video in a video library and an e-retailer offering that video to on-line consumers.
{IdletPseudonym} is a value that uniquely identifies an e-retailer's presentation package.

Stream switch 645 may be selected to provide streaming content to the requesting device.

Figure 7:
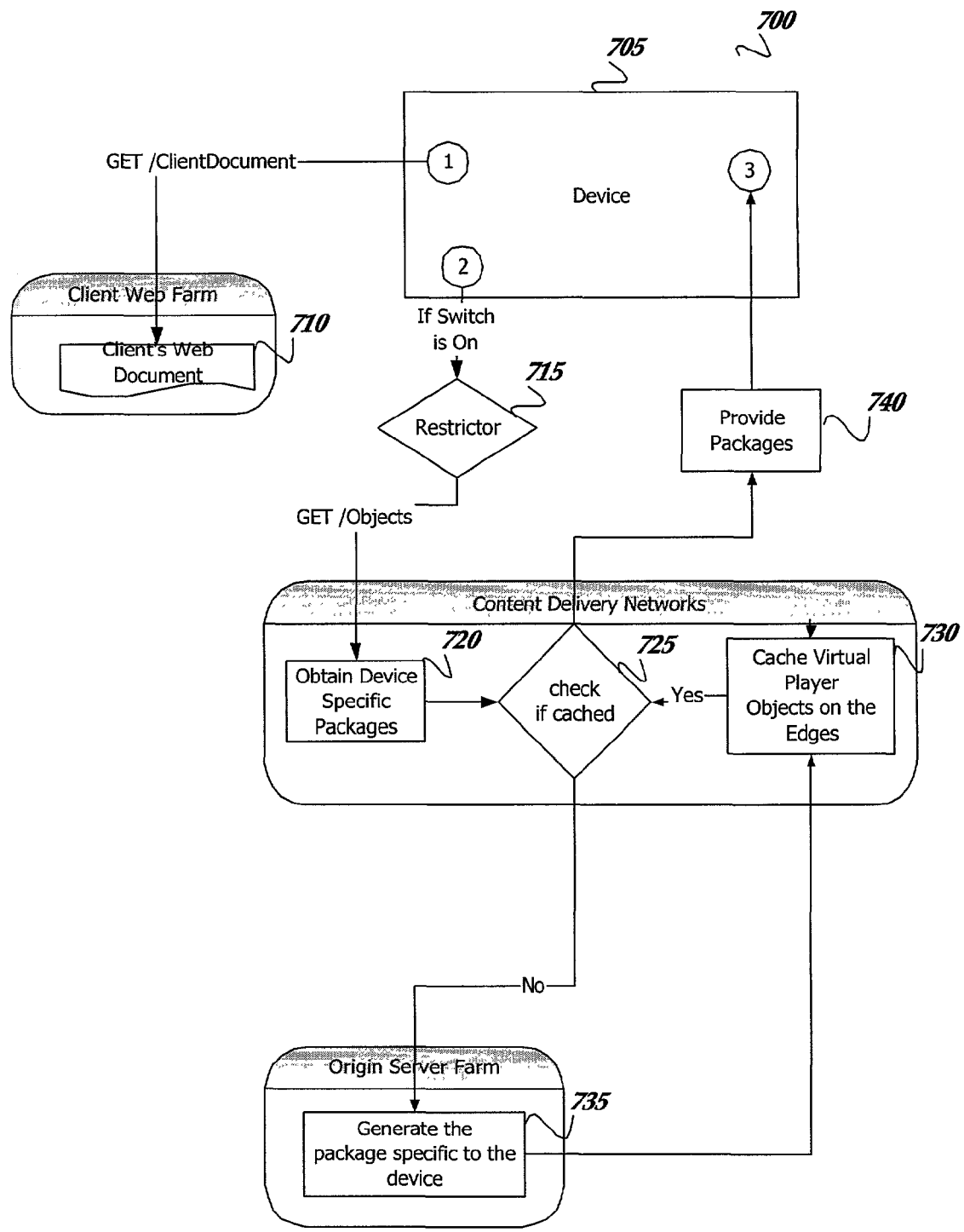
FIG. 7 shows an overview of the rich media presentation system.

FIG. 7 shows an overview of the rich media presentation system, in accordance with aspects of the invention. As shown in the figure, rich media presentation system 700 includes device 705, restrictor 715, web document 710, device specific package requester block 720, cache checking block 725, caching block 730, generate package block 735, and provide packages block 740.

The operation of rich media presentation system 700 will now be described. Device 705 requests client's web document 710 that initiates a request for rich media presentations from the provider. Upon accessing web document 710, device 705 requests optimized packages from the provider. The request goes through restrictor block 715 that may restrict access to the provider upon predefined conditions. For example, if the client is not affiliated with the provider the request for the packages may be denied. When the request is not denied package request block 720 requests device specific packages from the provider. Cache checking block 725 determines whether the packages are cached. If so, the packages are provided to device 705 from the cached location by package provider block 740, such as a content delivery network. When the packages are not cached the provider generates the packages specific to the device and caches them at which point, package provider block 740 provides the packages to device 705.

FIG. 8 illustrates an attribute inquiry system containing a set of exemplary basic attributes of network devices, according to one embodiment of the invention. Generally, attribute inquiry system 800 determines the requesting device's basic configuration including the operating system, browser, and media player used by the requesting device.

Server 805 communicates with the requesting device and receives basic configuration information in return. The configuration information is used to help optimize the requesting device's media experience. According to one embodiment of the invention, JavaScript code is executed on the requesting device that sends the basic attribute information to server 805.

For example, server 805 receives the operating system (OS) and browser used by the network device (block 830). For example, the requesting device of block 810 has a configuration using the WINDOWS XP operating system and using the Internet Explorer 6.0 browser. The requesting device of block 820 uses the UNIX operating system and uses Netscape 4.5 as the browser. The requesting device of block 840 uses the WINDOWS ME operating system and uses Internet Explorer 5.0 as the browser. The requesting device of block 850 uses the WINDOWS NT operating system and Netscape 4.75 as the browser. The requesting device of block 820 uses the UNIX operating system and Netscape 4.5 as the browser. The requesting device of block 870 is a mobile device. According to this embodiment, server 805 receives the mobile device's OS, browser, as well as its media player information. Similarly, server 805 receives the requesting device's media player according to one embodiment of the invention (block 860). The media player may be any media player type. For example, two popular media players include Real Player developed by Real Networks Corp. and Windows Media Player developed by Microsoft Corp. In addition to obtaining the brand of media player, server 805 also obtains the version of the media player. The media player information is used to produce the virtual player packages to be delivered to the requesting device.

Figure 9:
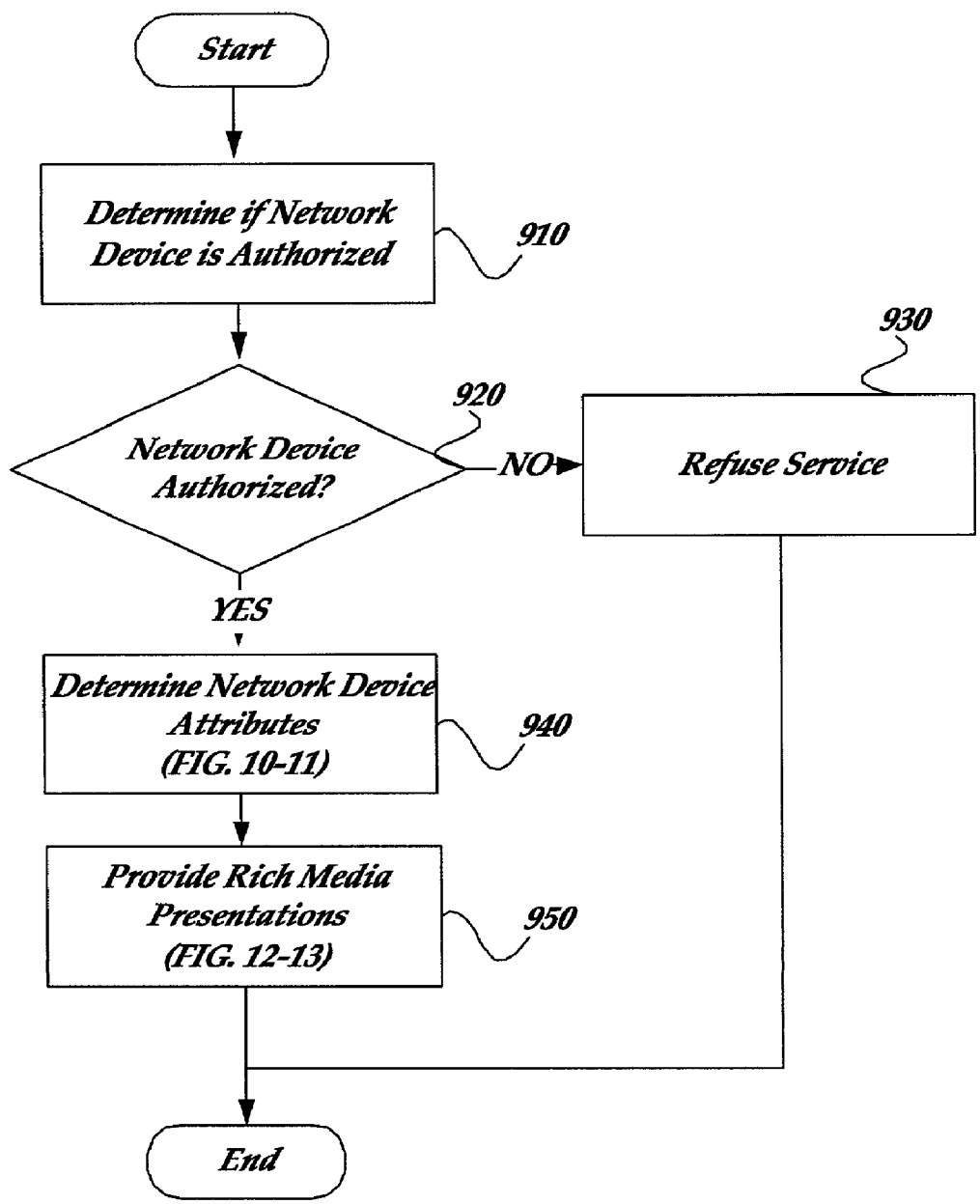
FIG. 9 shows an overview process of providing rich media presentations to an authorized network device.

FIG. 9 shows an overview process of providing rich media presentations to an authorized network device, according to one embodiment of the invention. After a start block, the logical flow moves to block 910 where a determination is made as to whether the network device is authorized to receive the rich media presentations. A device may not be authorized if the device is requesting the rich media presentations from an unaffiliated site. A site may not be affiliated when it does not have a relationship with the provider of the virtual player packages. Stepping to decision block 920, a decision is made as to whether the network device is authorized to receive the rich media presentations. When the network device is not authorized, the process moves to block 930, at which point the network device is refused service. When the service is refused, the process steps to an end block. When the network device is authorized, the process moves to block 940, where the network device's attributes are determined (See FIGS. 10 and 11 and related discussion). Moving to block 950, the rich media presentations needed by the device are provided to the device (See FIGS. 12-13 and related discussion). The process then steps to an end block.

FIG. 10 illustrates a process for determining attributes related to a network device, according to one embodiment of the invention. After a start block, the logic flows to block 1010, where the process detects the basic operating attributes of the requesting device. The basic operating attributes of the device are used to help create rich media presentations that are optimized for the requesting device. According to one embodiment of the invention, the basic attributes include the operating system, browser, and media player used by the requesting device. Other basic attributes may be used depending on the content to deliver to the requesting device. Moving to decision block 1020, a decision is made as to whether the basic operating characteristics are supported by the rich media presentation system. When the operating characteristics of the requesting device are not supported, the logical flow moves to block 1030 at which point the requesting device is informed that it is not supported. When the basic operating characteristics of the requesting device are supported, the process flows to block 1040 where additional attributes are obtained from the requesting device. The additional attributes provide the system with information that allows further optimization of the delivery of the content (See FIG. 11 and related discussion). The logical flow then ends.

FIG. 11 illustrates a process for retrieving additional attributes from the network device, according to one embodiment of the invention. After a start block, the logical flow moves to block 1110 where the language used by the device is determined. The determined language is used to provide the device with content matching their language preference. For example, if the determined language is Spanish, then the rich media presentations will be delivered to the device such that Spanish is supported. Similarly, if the determined language is English, then the rich media presentations are encoded for English. Flowing to block 1120, the network bandwidth is determined. The network bandwidth may be determined many different ways. According to one embodiment of the invention, the bandwidth is determined automatically by performing a download test on the requesting device. The requesting device may download a very small file having a predetermined size for a given period of time. The bandwidth is determined based on the number of files successfully downloaded for the given period of time. As the network conditions may change over time, the download test may be repeated. Moving to block 1130, a determination is made as to whether a firewall is present on the requesting device. Transitioning to block 1140 permissions on the requesting device are determined. For example, permissions may be set that disable the ability to perform certain operations across a network. Moving to block 1150, other attributes may be determined. Another attribute may be a protocol restrictions attribute or the other attributes may include any attributes that help to optimize the rich media presentations for the requesting device.

Figure 12:
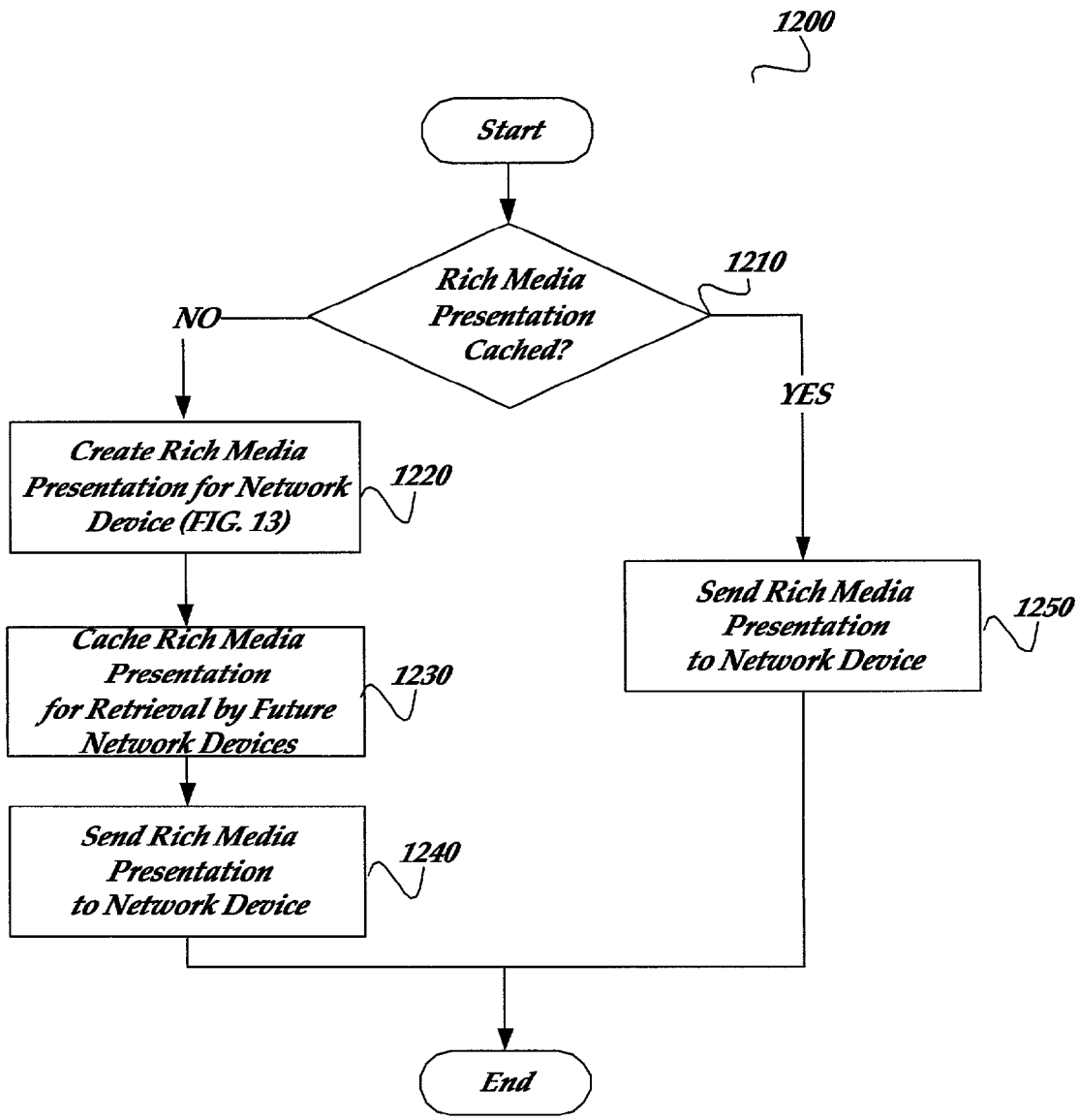
FIG. 12 illustrates a process for selecting a content provider to provide a rich media presentation to a device.

FIG. 12 illustrates a process for selecting a content provider to provide a rich media presentation to a device, according to one embodiment of the invention. After a start block, the process moves to decision block 1210, where the process determines whether the rich media presentations needed for the device are cached. When the rich media presentations are not cached, the process moves to block 1220 where the process creates a rich media presentation for the requesting device. Generally, the rich media presentation may be any or all of the following: a virtual player, a presentation package and a media package. Moving to block 1230 the rich media presentation is cached for later retrieval by a device. Transitioning to block 1240, the rich media presentation is delivered to the device. When the rich media presentation is cached the process steps to block 1250 at which point the cached rich media presentation is sent to the device. The process then steps to an end block and terminates.

Figure 13:
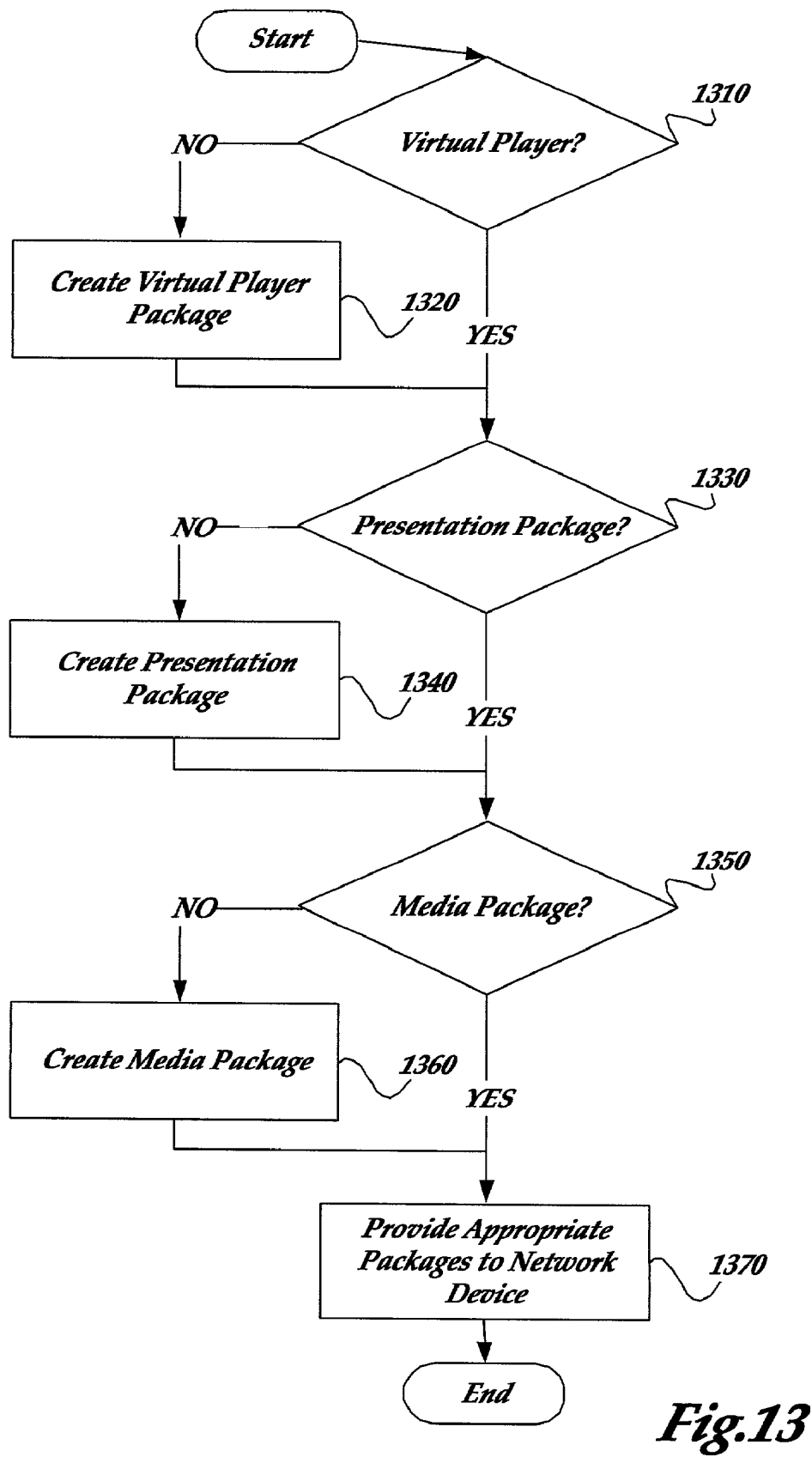
FIG. 13 shows a process for providing rich media presentations to a device.

FIG. 13 shows a process for providing rich media presentations to a device, according to one embodiment of the invention. After a start block, the process moves to decision block 1310, where a determination is made as to whether an up-to-date virtual player is already on the device. A virtual player is provided to the device when a virtual player is not in a cache on the device, or when an updated virtual player is available from the provider. When a virtual player is not on the device, the process moves to block 1320, at which point a virtual player package is created for the device.

The process transitions to decision block 1330, where a determination is made as to whether an up-to-date presentation package is already on the device. A presentation package is provided to the device when a presentation package is not in a cache on the device, or when an updated presentation package is available. When a presentation package is not on the device, the process moves to block 1340, at which point a presentation package is created for the device.

The process steps to decision block 1350, where a determination is made as to whether an up-to-date media package is already on the device. A media package is provided to the device when a media package is not in a cache on the device, or when an updated media package is available. When a media package is not on the device, the process moves to block 1340, at which point a media package is created for the device. According to one embodiment of the invention, a media package is provided to the device at each request as the media package is typically very small in size (approximately 1K).

Moving to block 1370, the created packages are provided to the device.

Figure 14:
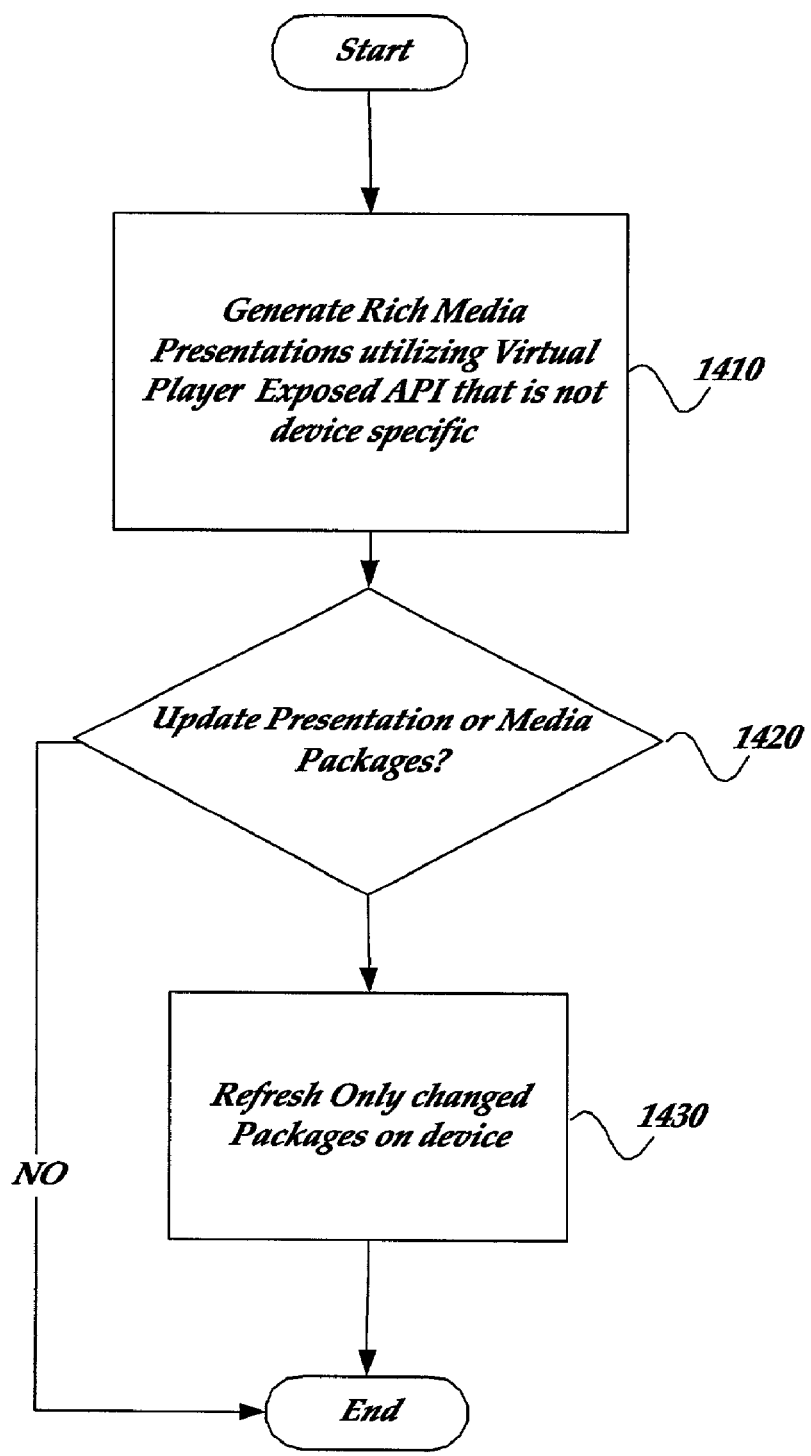
FIG. 14 shows a process for an e-retailer to create and modify rich media presentations.

FIG. 14 shows a process for an e-retailer to create and modify rich media presentations, in accordance with aspects of the invention. After a start block, the process moves to block 1410, where the e-retailer, or some other party, may generate rich media presentations utilizing a Virtual Player Exposed API that is not device specific. Transitioning to decision block 1420, a decision is made as to whether the presentation or media packages are to be updated. When the packages are not updated, the process steps to an end block. When they are to be updated, the appropriate updates are made and the process moves to block 1430 at which point the device receives the changed packages. The process then steps to an end block.

Figure 15:
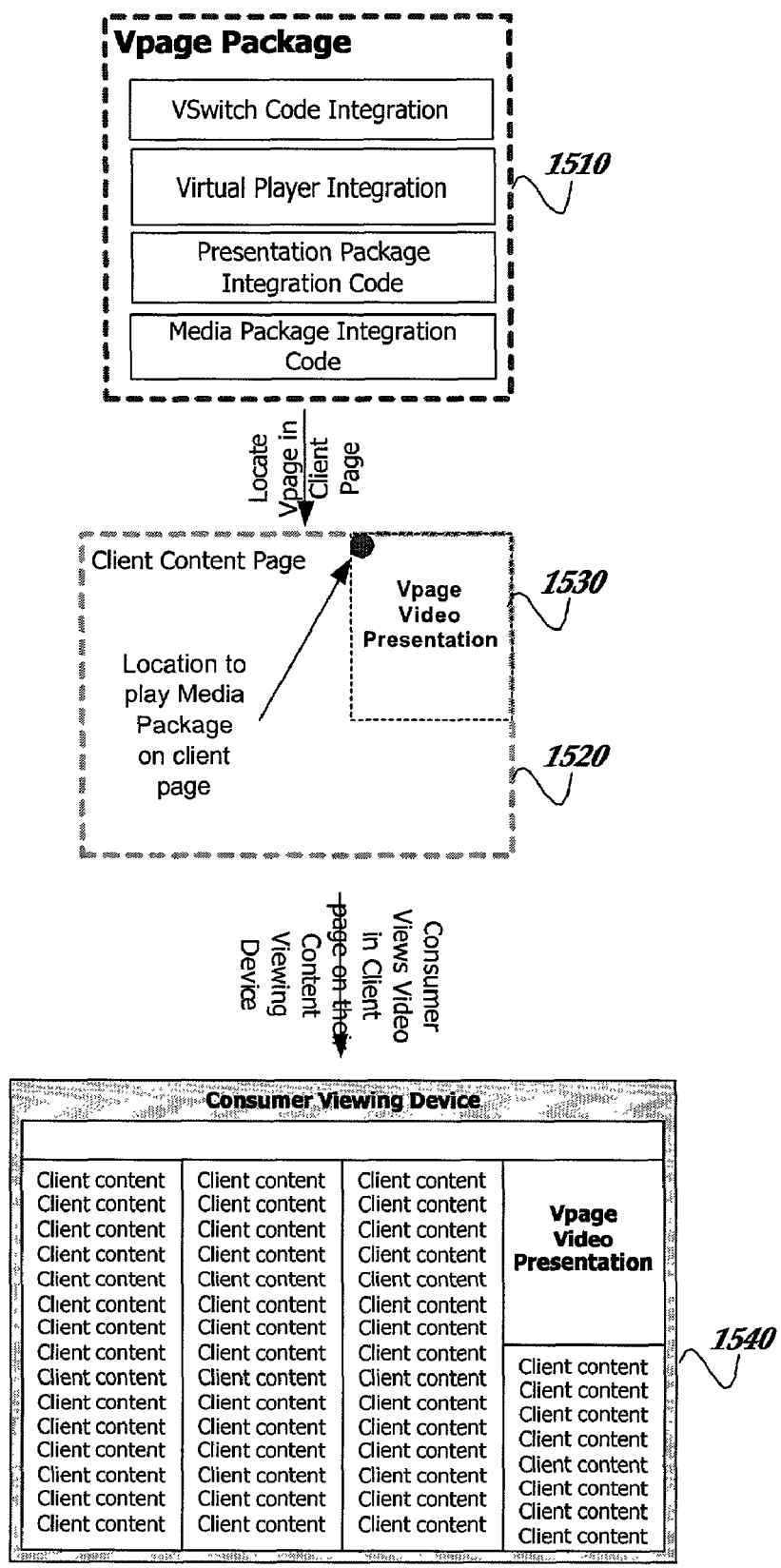
FIG. 15 illustrates a Vpage package system that provides client content pages with the ability to offer on-demand videos from video owners or product manufacturers to their consumers, in a seamless and consistent manner.

FIG. 15 illustrates a video page (Vpage) package system that provides client content pages with the ability to offer on-demand videos from video owners or product manufacturers to their consumers, in a seamless and consistent manner with rich media usage reporting. According to one embodiment of the invention, the Vpage is a page that shows a point of purchase video. As most product pages include one or more unique attributes, such as product name or UPCs or SKU number, these unique attributes are used in selecting a media package. The UPCs or SKU number may be used to automatically select the on-demand media package for the Vpage package. For example, a SKU number, such as SKU 102234, may indicate to play a product video for a toothbrush. One or more presentation and media packages within Vpage package 1510 is delivered to the client to be integrated into their content pages, such as content page 1520, where they want their consumers to view a media presentation. Since presentation packages uniquely define a presentation, most clients use the presentation package to extend their brand identity. Since each client uses its own brand creativity, each presentation package ends up being different from other presentation packages. Attributes such as UPCs or product names in client content pages are mapped to media packages that may be played to the user.

Client content page 1520 has an area for client content, as well as a Vpage media presentation area 1530 indicating where to present the media presentation, such as a video, to the user. The presentation may be located anywhere within client content page 1540.

When a consumer loads client content page 1520 into consumer viewing device 1540, the Vpage package presentation may be played to the user. According to one embodiment of the invention, this is a video of a product demonstration. This may occur automatically, or upon receiving a command from the user.

Figure 16:
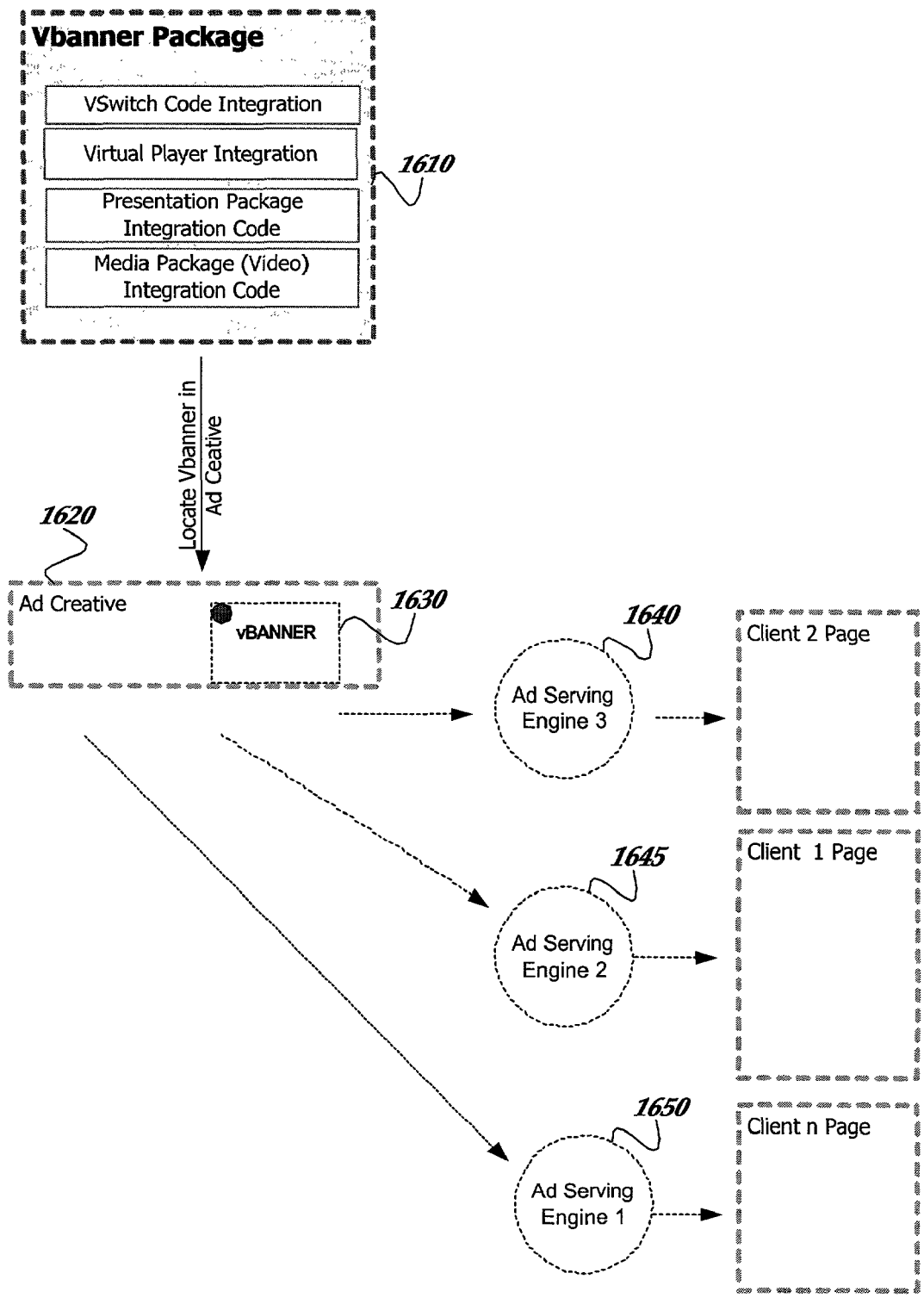
FIG. 16 shows a system for enabling Ad engines to deliver ads through their existing delivery systems to clients in which a video banner ad (Vbanner) is included.

FIG. 16 shows a system for enabling Ad engines to deliver ads through their existing delivery systems to clients in which a video banner ad (Vbanner) is included. An auto-play Vbanner is a banner ad that typically contains a graphic image and a small, short video that will begin playing automatically within a few seconds after the page finishes loading and where the video plays within the boundaries of the banner ad. A template is designed that allows a client to easily input a handful of items (presentation package, video package, etc.) into a base set of code included in Vbanner package 1610. This base code with the additional values added then constitute an auto-play video banner ad and is submitted to a banner ad serving company for distribution on multiple web sites. These Vbanner packages enable Ad engines to deliver ads containing streaming media through their existing ad delivery systems with consistent rich media usage reporting.

Most clients build their ad creative content pages 1620 with some automation and serve these ads to third party content pages using their ad serving engines (Ad Serving Engine 1 1650, Ad Serving Engine 2 1645, and Ad Serving Engine 3 1640) and existing ad tracking technology solutions. Thus each client creates one or more Vbanner packages including a virtual player, the presentation package and media packages.

The detection phase and the preparation of the virtual player phase is separated to determine the best and fastest way to present a streaming video inside ad creative 1620 in which Vbanner package 1630 is integrated.

An example will be used to clarify the discussion. When the integration code along with the Destination URL is submitted to a client, the client adds these two items to their banner ad serving engine. When the banner ad is served to a particular site, a number of different values are added to a query string. One of the values that the client will dynamically append to the query string is an ID that specifies the ad creative in the client's system and also allows the client to redirect any clicks on the banner ad to the appropriate URL after registering a click on the client's system. The client system is able to dynamically add the query string values whenever the code is sent to a particular web page, so therefore no query string values are included in the request. The ad serving engines may then deliver the video banner to the client pages when requested.

The user has the ability to click on a portion of the banner ad that is located outside of the media player while the video is playing and as a result of the click being taken to a designated URL. The designated URL may be loaded in either the existing browser window or a new browser window.

The user also has the ability to click anywhere on the banner ad after the video has finished playing and go to a designated URL. According to this embodiment, an auto-hide attribute is turned on and the image is then used as the locator image object that is clickable.

The banner ad may also replace the entire graphic used while the video is playing with a different animated graphic after the video finishes playing. If the user clicks on the animated graphic, it takes them to a designated URL. One option is to simply have one image that takes up the entire space of the banner ad, is used as the locator image object, and integrates the first frame of the video into the portion of the graphic where the video will eventually be playing. Another option is to have multiple images located within the banner ad that are selectable.

The presentation package system, which in this case is the Vbanner package system, has the ability to detect an unsupported O/S & browser combination (an unsupported customer) and respond accordingly. According to one embodiment, the system displays only a graphic image for the banner ad that may be selectable. If an unsupported consumer clicks on the graphic image, it will take them to a designated URL (the designated URL could be loaded in either the existing browser window or a new browser window based on the customer's requirements). This URL may be different than the URL for supported consumers. The URL may be different since the unsupported customer may not have the ability to view all of the presentation packages that a supported customer may view.

According to one embodiment, a consumer clicks on a banner ad graphic and shortly thereafter, a video begins to play. The banner may also be set to auto-play. Under the auto-play condition a video automatically begins to start playing within the boundaries of the banner. According to one embodiment of the invention, the banner video begins to play after the pages finishes loading. A Vbanner ad may also have a combination of auto-play video and click to play video.

The customer has many options relating to the characteristics of the banner ad. The customer may locate the video at a specific location relative to the top left corner of the banner ad graphic. The customer may play the video associated with the banner ad in a new popup browser window (resized to fit around the player skin or video) in the center of the screen. The customer may play the video so it appears embedded on the page and outside of the boundaries of the banner ad. The customer may include/exclude a player skin with video controls. The customer may include a "Buy" button or call to action button that, when clicked, takes the consumer to another web page. The customer has the ability to load the target web page in the browser before the video is played in a new popup window. The customer may include any number of Vbanners on a web page.

Figure 17:
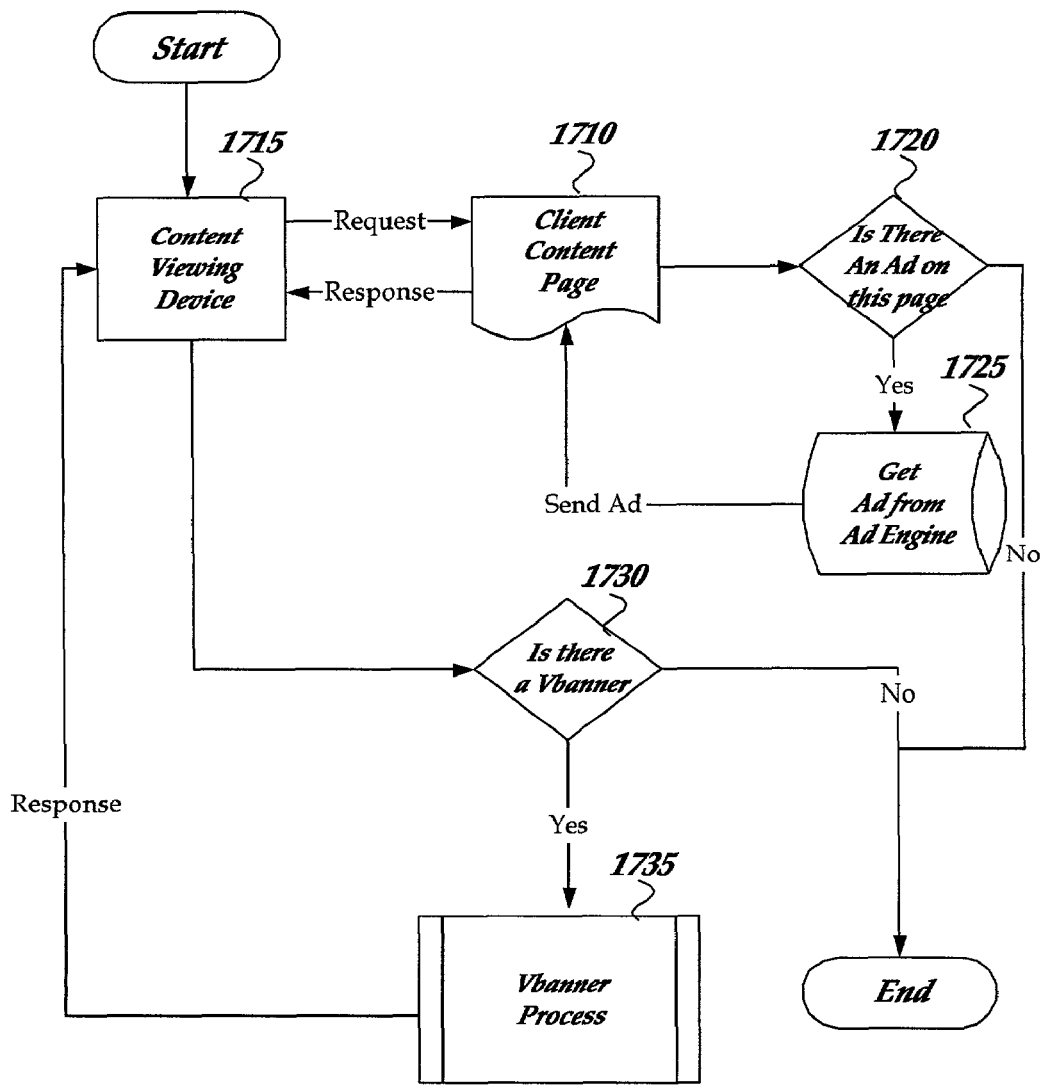
FIG. 17 illustrates a process flow for an on-demand video banner

FIG. 17 illustrates a process flow for an on-demand video banner, in accordance with aspects of the invention. After a start block, the process moves to block 1715 where the content viewing device requests a client content page 1710. The client content page 1710 steps to decision block 1720, where a determination is made as to whether there is an Ad on the requested page. When there is an Ad on the requested client content page, the Ad is requested from an Ad Engine (block 1725). The Ad engine sends the Ad to the client content page. When there is not an Ad on the page the process moves to an end block and returns to processing other actions. When the client content page is returned to the content viewing device, the process flows to decision block 1730 where a determination is made as to whether there is a Vbanner within the requested page. When there is a Vbanner, the process moves to block 1735 where the Vbanner is played on the content viewing device when supported. The process for playing the Vbanner is the same as described in the previous figures. When there is not a Vbanner on the requested page the process moves to an end block and returns to processing other actions.

Figure 18:
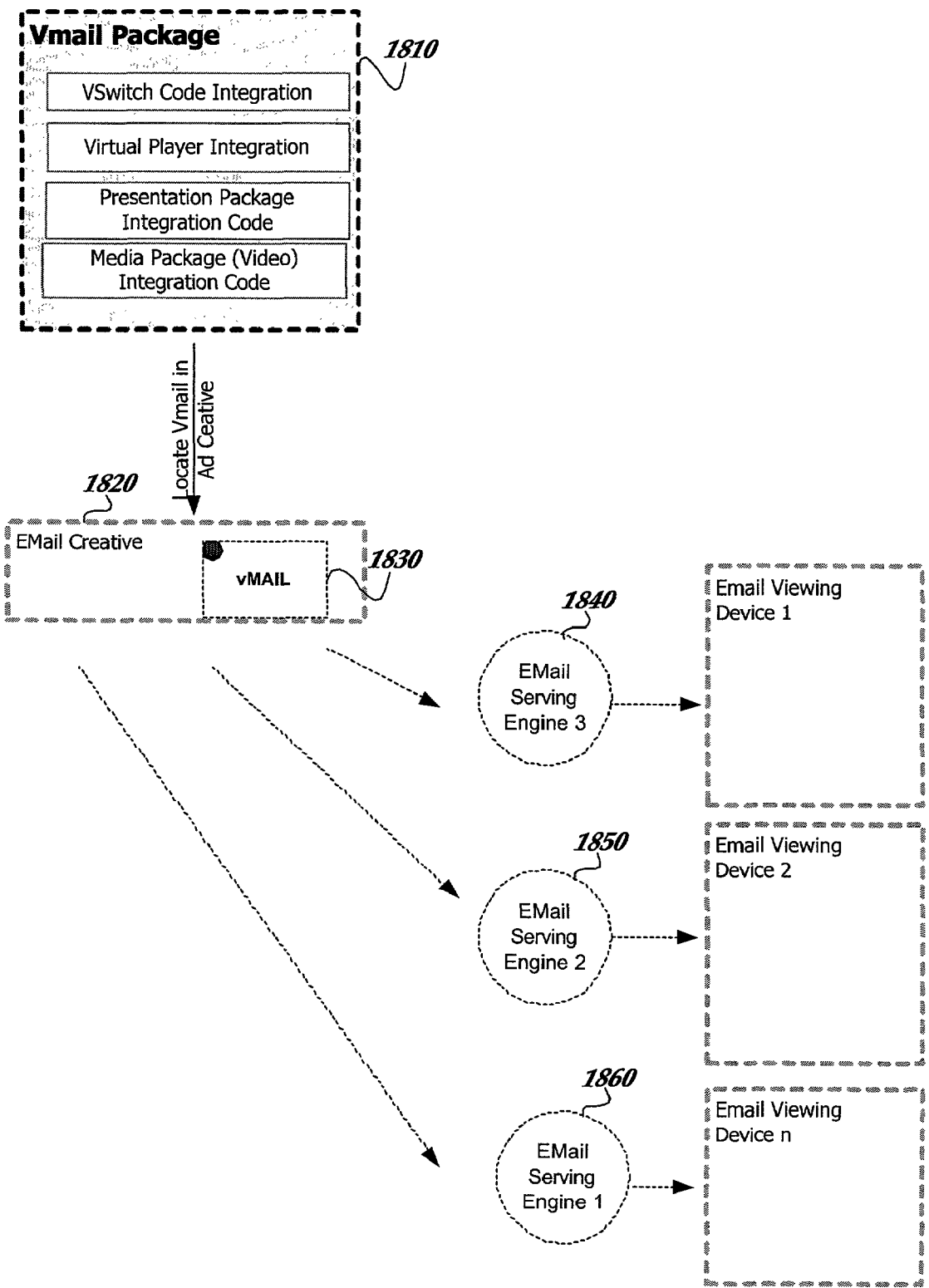
FIG. 18 shows a system enabling the delivery of HTML E-mail containing streaming media through an existing email distribution systems.

FIG. 18 shows a system enabling the delivery of HTML E-mail containing streaming media through an existing email distribution systems with consistent rich media usage reporting. Generally, the video mail (Vmail) system allows an email to include a media package that is played in response to the email being open by the user.

Each email sender is provided with one or more Vmail packages 1810 including a virtual player, a presentation package, and a media package to include in email creative 1820. Vmail takes advantage of separating the detection phase and the preparation for the virtual player phase to determine the best way to present a streaming video inside of the email for the respective email viewing device. Vmail uses the technology as described above to provide and process the media packages. The creator of the Email creative 1820 has many options relating to the playing and presentation of Vmail 1830. These include, but are not limited too, location of the video within the email, name, buttons displayed with the email, auto hide after playing, and the like. The customer may determine how e-mail recipients do not support JavaScript will be handled. When JavaScript is not supported, an image may be displayed in the placeholder location without a link to anything further, a link to a video in a popup window may be provided. In this case, the e-mail recipient will be able to click on a link or image to see the video in a browser window that is opened. The e-mail recipient may also be provided a link to a web page where the e-mail recipient will be able to click on a link or image to open a browser window where the entire video mail creative is displayed and the video can be played. The customer also may set many options controlling the playing and viewing experience of the video. The customer also provides an image, such as a .gif image that is displayed before the video begins playing and after the video is completed. The size of this .gif image is equal to the size of the video. A default image file may also be displayed. Showing an image, such as the first image of the video, may create the impression that the video starts to play faster than it actually does. An image may also be displayed for e-mail recipients that do not support JavaScript.

Figure 19:
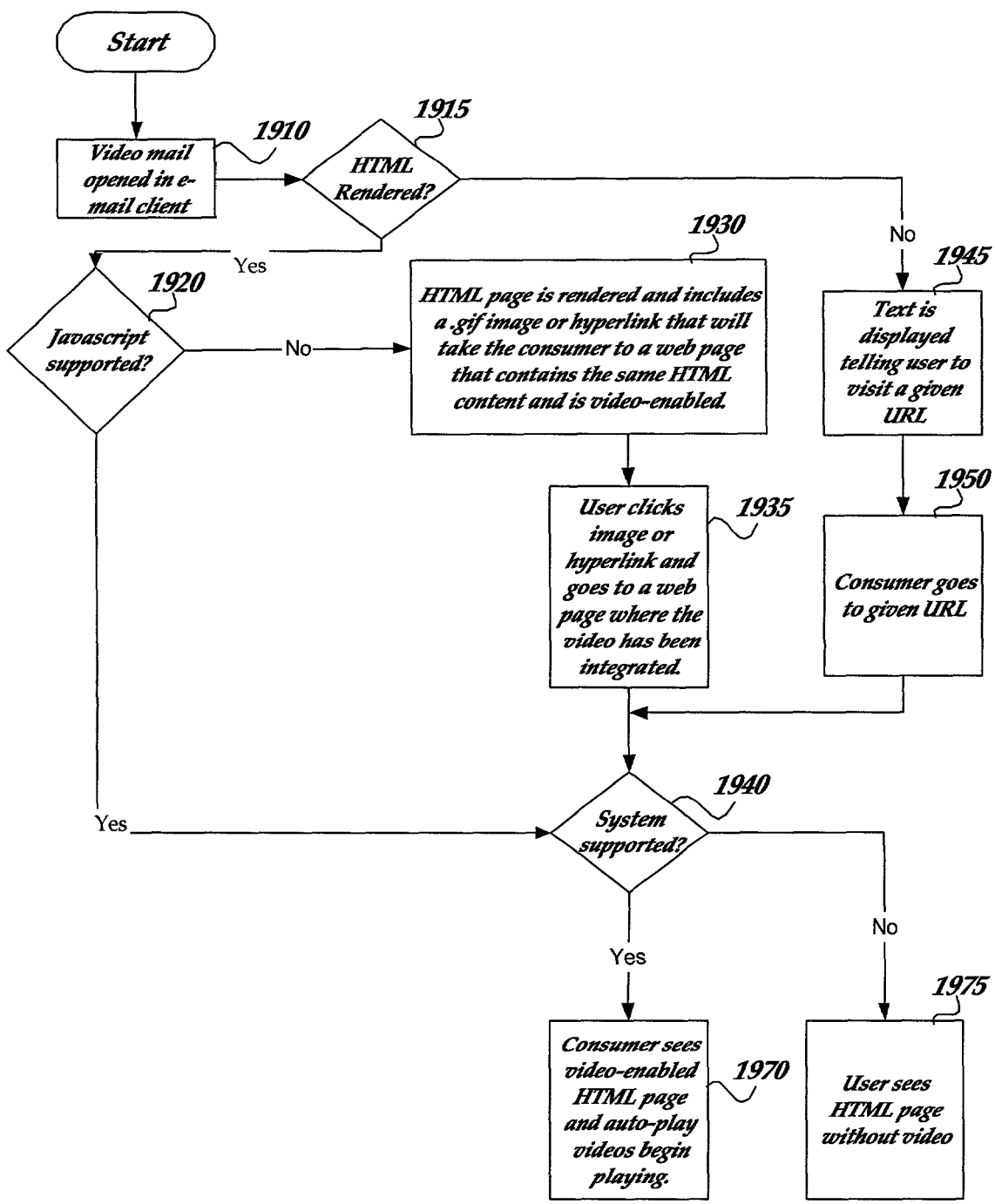
FIG. 19, shows a process flow for an on-demand video mail process.

FIG. 19 shows a process flow for an on-demand video mail process, in accordance with aspects of the invention. After a start block, the process moves to block 1910, at which point the video mail is opened in the e-mail client. Transitioning to decision block 1915, a decision is made as to whether the e-mail is HTML rendered. When the e-mail is not HTML rendered, and therefore, the e-mail client does not support HTML, the process moves to block 1945, where text may be displayed to the user telling them to visit a URL to view the video. Moving to block 1950, the consumer may go the displayed URL to view the presentation package. The process then transitions to decision block 1940.

When the e-mail client does support HTML, the process moves to decision block 1920 which determines if JavaScript is supported. When JavaScript is supported, the process moves to decision block 1940. When JavaScript is not supported the process moves to block 1930, at which point the HTML pages is rendered. The rendered page may include an image, such as a .gif image, that the user may select to view the video. For example, the image may be displayed in the placeholder location without a link to anything further, a link to a video in a popup window may be provided. In this case, the e-mail recipient will be able to click on a link or image to see the video in a browser window that is opened. The rendered page may also include a link that will take the user to a web page where the user may view the video. Transitioning to block 1935, the e-mail recipient may click on the link or image to open a browser window where the entire video mail creative is displayed and the video can be played. The process flows to decision block 1940.

At decision block 1940 a determination is made as to whether the system is supported. A system may not be supported if it is not authorized to view the presentation package or if the system does not have the capability of playing the presentation package. When the system is supported, the process steps to block 1970, where the user sees the video-enabled page and the video (presentation package) may begin to automatically play. When the system is not supported, the process steps to block 1975 where the user sees the page without the video.

Figure 20:
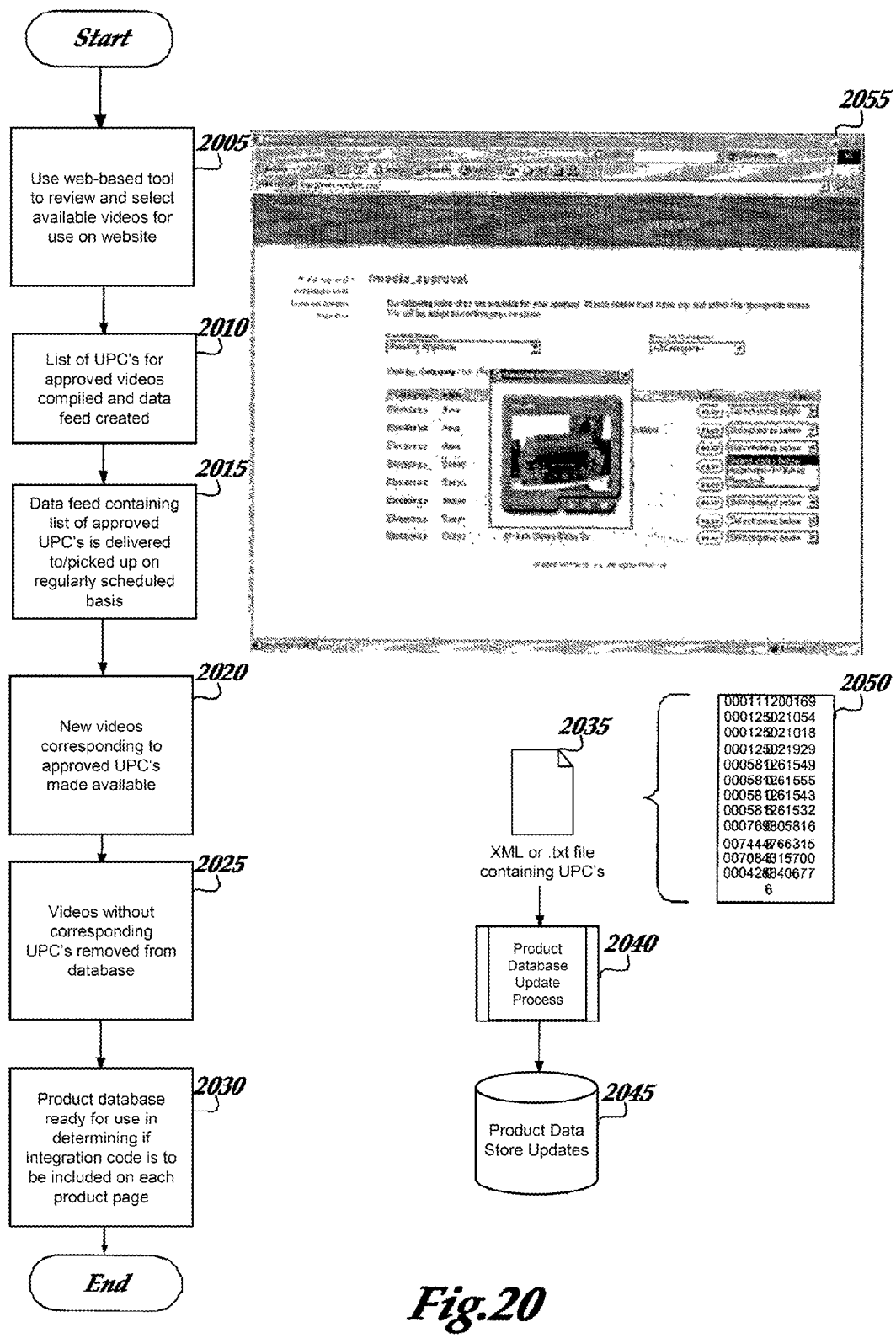
FIG. 20 illustrates a product database update process.

FIG. 20 illustrates a product database update process. After a start block, the process moves to block 2005, where a web-based tool may be used to review available rich media presentations, such as videos, and select the ones they will use on their website. Page 2055 illustrates a schematic of an exemplary web-based tool. Moving to block 2010, the list of UPC's, or some other identifier, for approved videos is compiled and a data feed created. Transitioning to block 2015, the data feed containing the list of approved UPC's is delivered to/picked up. This generally occurs on a regularly scheduled basis. Next, at block 2020, the process makes available the new videos corresponding to the approved UPC's. Similarly, at block 2025 the videos that no longer have corresponding UPC's are removed from the database. Transitioning to block 2030, the database now contains the updated videos and UPC's and may be used in determining when integration code is to be included on each product page. According to one embodiment, the UPC's are contained within an XML or text file, that are then used to update (block 2040) the product data store (2045). The process then moves to an end block and returns to processing other actions.

Figure 21:
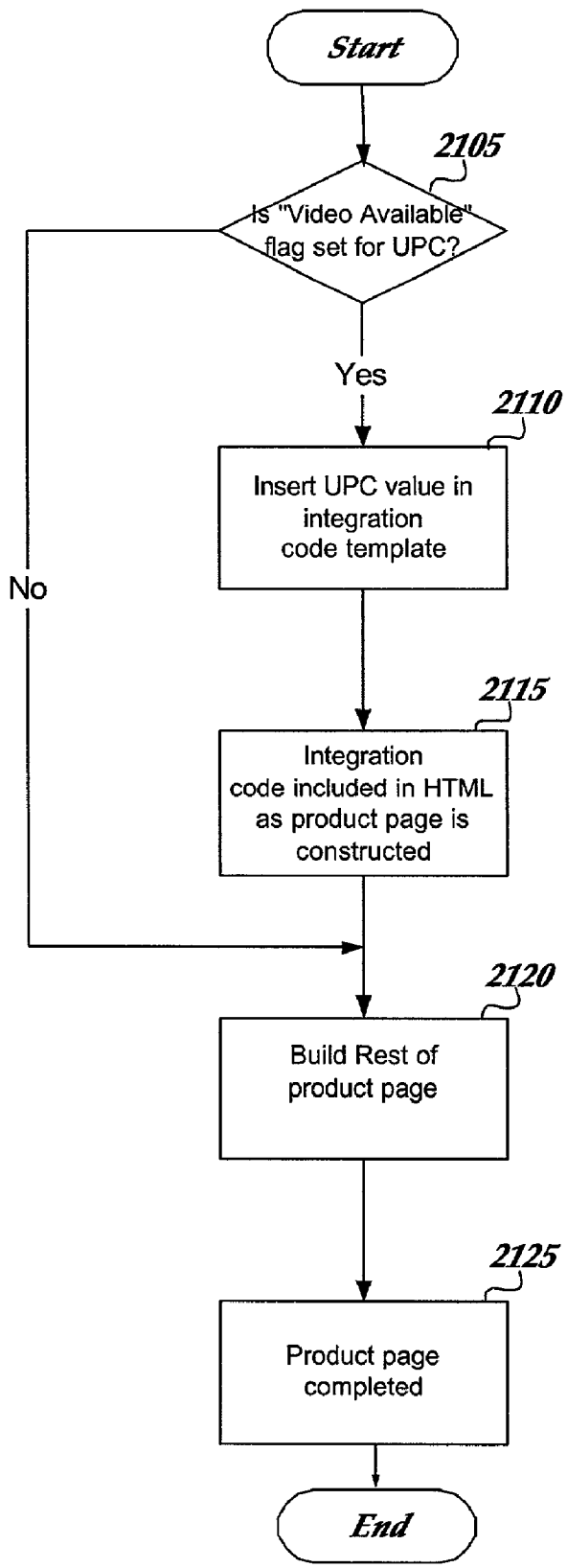
FIG. 21 shows a product page build process.

FIG. 21 shows a product page build process. After a start block, the process moves to decision block 2105, where a determination is made as to whether the video is available. When the video is not available, the process steps to block 2120. When the video is available, the process transitions to block 2110, at which point the UPC value is inserted into the integration code template. Moving to block 2115, the integration code is included in the HTML page when the product page relating to the UPC is constructed. Flowing to block 2120, the rest of the product page is built. The product page includes parameters that the customer may modify when selecting what items to include on their web page. Stepping to block 2125, the product page is completed. The process then steps to an end block and returns to processing other actions.

Figure 22:
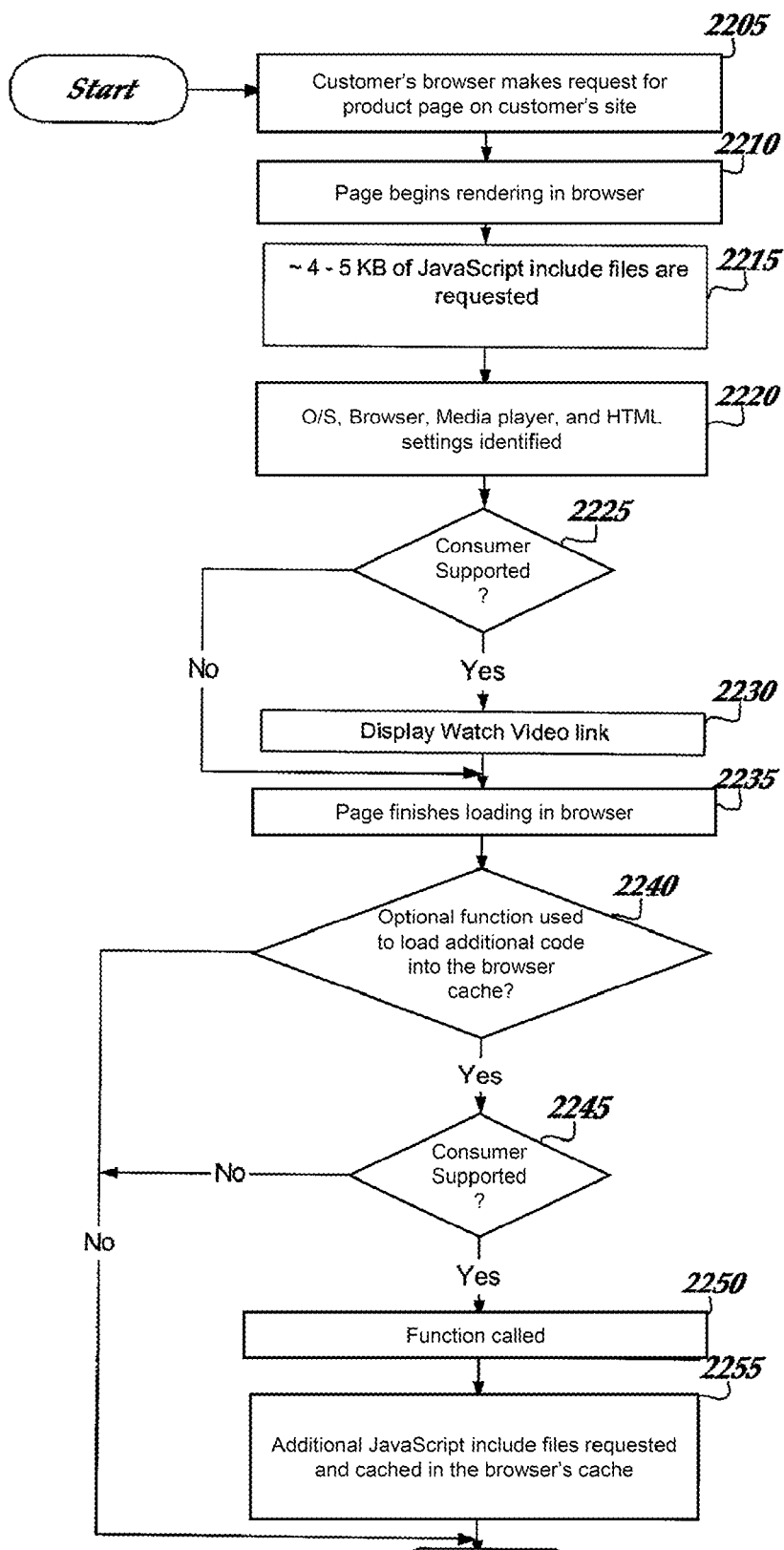
FIG. 22 illustrates a page load process, in accordance with aspects of the invention.

FIG. 22 illustrates a page load process. After a start block, the process moves to block 2205, where the consumer's browser requests a product page on the customer's site. Moving to block 2210, the product page begins to render in the consumer's browser. Transitioning to block 2215, include files are requested relating to the playing of the rich media presentation. According to one embodiment of the invention, these files are requested from a CDN. Flowing to block 2220, the attributes relating to the requesting device are determined. Moving to decision block 2225, a determination is made as to whether the consumer is supported. When the user is not supported, the process steps to block 2235. When the user is supported, the user may be displayed the watch video link. At block 2235, the page finishes loading in the browser. Transitioning to decision block 2240, a determination is made as to whether to load any additional code into the consumer's cache. When the optional code is to be loaded, the process moves to decision block 2245 where a determination is made as to whether the consumer is supported. When the decision is supported, the function to add more code is called, the additional code is requested, and the additional code is cached in the consumer's browser (block 2255). The process then steps to an end block and returns to processing other actions. When optional code is not to be included, or the user is not supported, the process steps to an end block and returns to processing other actions.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method comprising:
   receiving an indication over a network, in response to a request for access to a rich media presentation by an internet browser on a network device, that the internet browser on the network device has requested access to the rich media presentation;
   in response to the receiving an indication, detecting one or more attributes of one or both of rich media capabilities associated with the internet browser or rich media capabilities associated with the network device; and selecting a rich media presentation to be sent to the internet browser from among a plurality of rich media presentations based on the one or more attributes that are detected, wherein a selected rich media presentation includes a media package selected based on the one or more attributes that are detected and a virtual player configured to play the media package on the network device.

2. The method of claim 1, wherein the detecting one or more attributes comprises detecting two or more attributes from: an operating system type attribute, a plug-in attribute, a browser type attribute, a firewall attribute, a monitor setting attribute, a language attribute, a bandwidth attribute, or a protocol attribute.

3. The method of claim 1, further comprising causing the selected rich media presentation to be sent to the internet browser.

4. The method of claim 3, wherein the causing the selected rich media presentation to be sent comprises determining whether one or both of the internet browser or the network device supports playing the selected rich media presentation; configuring the selected rich media presentation based on the detected attributes responsive to a determination that playing the selected rich media presentation is supported; otherwise, causing a supported rich media presentation to be sent to the internet browser.

5. The method of claim 4, further comprising allowing a client to modify one or more characteristics associated with the selected rich media presentation.

6. The method of claim 5, wherein the causing the selected rich media presentation to be sent comprises utilizing an ad serving engine.

7. The method of claim 5, wherein the causing the selected rich media presentation to be sent comprises using an email serving engine.

8. The method of claim 5, further comprising causing an image to be delivered to the network device for display on the network device at a location relating to the selected rich media presentation.

9. The method of claim 5, wherein the selecting a rich media presentation comprises:
selecting the virtual player configured to play the media package on the network device;
selecting a presentation package configured for the network device; and
selecting the media package.

10. The method of claim 3, wherein detecting the one or more attributes comprises detecting an attribute that indicates a media player type for a media player included on the network device.

11. One or more computer-readable storage media embodying instructions which, responsive to execution by a computing device, are configured to perform operations comprising:
determining automatically when a rich media presentation is accessed by an internet browser on a network device, in response to a request for access to the rich media presentation by the internet browser, when the network device is coupled to a network;
detecting one or more attributes of one or both of rich media presentation capabilities associated with the internet browser or rich media presentation capabilities associated with the network device in response to the request; and
causing the rich media presentation to be sent to the internet browser, wherein the rich media presentation includes a media package selected based on the one or more attributes that are detected and a virtual player configured to play the media package.

12. The one or more computer-readable storage media of claim 11, the operations further comprising:
determining when one or both of the internet browser or the network device supports playing the rich media presentation;
configuring the rich media presentation based on the one or more attributes that are detected responsive to a determination that playing the rich media presentation is supported; otherwise,
causing a supported rich media presentation to be sent to the internet browser.

13. The one or more computer-readable storage media of claim 12, wherein the rich media presentation is configured to be presented within a banner ad that is selectable to cause an action to be performed.

14. The one or more computer-readable storage media of claim 13, the operations further comprising: causing an ad serving engine to send the rich media presentation.

15. The one or more computer-readable storage media of claim 13, the operations further comprising: causing an email serving engine to send the rich media presentation.

16. The one or more computer-readable storage media of claim 13, the operations further comprising: causing an image to be delivered to the network device for display on the network device at a location relating to the rich media presentation.

17. The one or more computer-readable storage media of claim 11, wherein the one or more attributes that are detected comprise at least one of: an operating system type attribute; a plug-in attribute; a browser type attribute; a firewall attribute; a monitor setting attribute; a language attribute; a bandwidth attribute; or a protocol attribute.

18. A system comprising:
a computing device configured to execute instructions to implement a rich media presentation application configured to:
automatically determine when a rich media presentation is attempted to be accessed by an internee browser on a network device;
detect one or more attributes of one or both of rich media presentation capabilities associated with the internet browser or rich media presentation capabilities associated with the network device in response to a request from the network device for access to the rich media presentation; and
select a rich media presentation from among a plurality of rich media presentations, based on the one or more attributes that are detected, to be provided to the internet browser, wherein a selected rich media presentation includes a media package selected based on the one or more attributes that are detected and a virtual player configured to play the media package.

19. The system of claim 18, wherein the rich media presentation application is further configured to cause a selected rich media presentation to be sent to the internet browser.

20. The system of claim 19, wherein the selected rich media presentation is configured to be presented within a banner ad that is selectable by the network device to cause an action to be performed.

21. The system of claim 19, wherein the selected rich media presentation is caused to be sent to the internet browser utilizing an ad serving engine.

22. The system of claim 19, wherein the selected rich media presentation is caused to be sent to the internet browser comprises using an email serving engine.

23. The system of claim 19, wherein the selected rich media presentation application is further configured to cause an image to be delivered to the internet browser, the image being configured to be displayed within the internet browser at a location relating to the selected rich media presentation.

24. The system of claim 19, wherein the detected one or more attributes comprise at least one of: an operating system type attribute, a plug-in attribute; a browser type attribute; a firewall attribute; a monitor setting attribute; a language attribute; a bandwidth attribute; or a protocol attribute.

25. The system of claim 24, wherein the rich media presentation application is further configured to determine when one or both of the internet browser or the network device supports playing the selected rich media presentation; configure the selected rich media presentation based on the one or more attributes that are detected responsive to a determination that playing the selected rich media presentation is supported; otherwise, cause a supported rich media presentation to be sent to the internet browser.

* * * * *

UNITED STATES PATENT AND TRADEMARK OFFICE
CERTIFICATE OF CORRECTION

| | | |
|---|---|---|
| PATENT NO. | : 8,046,672 B2 | Page 1 of 1 |
| APPLICATION NO. | : 10/084258 | |
| DATED | : October 25, 2011 | |
| INVENTOR(S) | : Hegde et al. | |

It is certified that error appears in the above-identified patent and that said Letters Patent is hereby corrected as shown below:

Title page, item (75), under "Inventors", in Column 1, Line 2, delete "McGrath," and insert -- McGrath, III, --.

Title page, item (63), under "Related U.S. Application Data", in Column 1, Line 2, delete "2002." and insert -- 2002, now Pat. No. 7,155,436. --.

Column 1, line 9, delete "2002," and insert -- 2002, now U.S. Pat. No. 7,155,436, --.

Column 22, line 43, in Claim 18, delete "internee" and insert -- internet --.

Signed and Sealed this
Twelfth Day of June, 2012

David J. Kappos
*Director of the United States Patent and Trademark Office*